(12) United States Patent
Barrett et al.

(10) Patent No.: US 11,976,924 B2
(45) Date of Patent: May 7, 2024

(54) MULTI-AXIS ATOM INTERFEROMETER SYSTEM AND METHOD

(71) Applicants: IXBLUE, Saint-Germain-en-Laye (FR); INSTITUT D'OPTIQUE GRADUATE SCHOOL, Palaiseau (FR); CENTRE NATIONAL DE LA RECHERCHE SCIENTIFIQUE, Paris (FR); UNIVERSITE DE BORDEAUX, Bordeaux (FR)

(72) Inventors: David Brynle Barrett, Talence (FR); Pierrick Cheiney, Saint-Germain-en-Laye (FR); Philippe Bouyer, Talence (FR)

(73) Assignees: EXAIL, Saint-Germain-en-Laye (FR); INSTITUT D'OPTIQUE GRADUATE SCHOOL, Palaiseau (FR); CENTRE NATIONAL DE LA RECHERCHE SCIENTIFIQUE, Paris (FR); UNIVERSITE DE BORDEAUX, Bordeaux (FR)

( * ) Notice: Subject to any disclaimer, the term of this patent is extended or adjusted under 35 U.S.C. 154(b) by 483 days.

(21) Appl. No.: 17/288,483

(22) PCT Filed: Oct. 28, 2019

(86) PCT No.: PCT/FR2019/052564
§ 371 (c)(1),
(2) Date: Apr. 23, 2021

(87) PCT Pub. No.: WO2020/084272
PCT Pub. Date: Apr. 30, 2020

(65) Prior Publication Data
US 2021/0389127 A1  Dec. 16, 2021

(30) Foreign Application Priority Data
Oct. 26, 2018 (FR) ..................... 1859950

(51) Int. Cl.
| | | |
|---|---|---|
| *G01C 19/58* | (2006.01) |
| *G01P 15/093* | (2006.01) |
| *G01P 15/18* | (2013.01) |
| *G21K 1/06* | (2006.01) |

(52) U.S. Cl.
CPC ............ *G01C 19/58* (2013.01); *G01P 15/093* (2013.01); *G01P 15/18* (2013.01)

(58) Field of Classification Search
CPC ....... G01C 19/58; G01P 15/093; G01P 15/18; G21K 1/006
See application file for complete search history.

(56) References Cited

U.S. PATENT DOCUMENTS 8,860,933 B2 * 10/2014 Compton ................ G01P 15/08
73/1.37
10,330,459 B1 * 6/2019 Matthews ............... G01P 15/08
(Continued)

FOREIGN PATENT DOCUMENTS

| FR | 2 877 430 | 5/2006 | |
| FR | 2877430 A1 * | 5/2006 | ............. G01C 19/58 |

OTHER PUBLICATIONS

International Search Report for PCT/FR2019/052564 dated Mar. 13, 2020, 7 pages.
(Continued)

*Primary Examiner* — Uzma Alam
*Assistant Examiner* — Adrian Ignacio Silva
(74) *Attorney, Agent, or Firm* — NIXON & VANDERHYE

(57) ABSTRACT

Disclosed is a multi-axis atom interferometer system, including a source of cold atoms, a laser source generating a first light pulse configured in such a way as to spatially split the source of cold atoms into a first cloud of atoms propagating along a first trajectory along a first axis and a second cloud of atoms propagating along a second trajectory (Continued)

along a second axis, a second light pulse adapted to spatially deflect the first trajectory along the second axis and simultaneously the second trajectory along the first axis towards a first point and a last light pulse adapted to recombine the at least one part of the first cloud of atoms and the at least one part of the second cloud of atoms at the first point, and a detection system measuring an interferometric phase-shift accumulated between the first light pulse and the last light pulse.

19 Claims, 5 Drawing Sheets

(56) References Cited

U.S. PATENT DOCUMENTS

2016/0216114 A1* 7/2016 Kotru .................... G01C 19/58
2016/0298967 A1* 10/2016 Johnson ................ G01C 19/58
2017/0016710 A1* 1/2017 Black .................... G01C 19/58

OTHER PUBLICATIONS

Written Opinion of the ISA for PCT/FR2019/052564 dated Mar. 13, 2020, 9 pages.
Canuel et al., "6-AXis Inertial Sensor Using Cold-Atom Interferometry", arxiv.org, CORNELL UNIVERSITY LIBRARY, April 7, 2006, XP080235504, 5 pages total.
Barrett et al., "Inertial Quantum Sensors Using Light And Matter", arxiv.org, Cornell University Library, Mar. 10, 2016, XP080963689, 20 pages total.
Wu et al., "Multiaxis atom interferometry with a single diode laser and a pyramidal magneto-optical trap", Optica, vol. X, No. X, Apr. 2016, 7 total pages.

* cited by examiner

MULTI-AXIS ATOM INTERFEROMETER SYSTEM AND METHOD

CROSS-REFERENCE TO RELATED APPLICATIONS

This application is the U.S. national phase of International Application No. PCT/FR2019/052564 filed Oct. 28, 2019 which designated the U.S. and claims priority to FR 1859950 filed Oct. 26, 2018, the entire contents of each of which are hereby incorporated by reference.

TECHNICAL FIELD TO WHICH THE INVENTION RELATES

The present invention generally relates to the field of inertial sensors based on an atom interferometer for acceleration and/or rotation measurements.

It more particularly relates to an inertial sensor based on an atom interferometer for simultaneous acceleration and rotation measurements along several axes.

It more particularly relates to a simultaneous multi-axis sensor for applications in inertial navigation, gyrometry, accelerometry, geology, gravimetry, gradiometry, geodesy, seismology or fundamental physics.

TECHNOLOGICAL BACK-GROUND

The inertial sensors based on the atom interferometers are on the verge of revolutionizing the field of inertial navigation because they exhibit both a high sensitivity and a high accuracy of measurement. To calculate the trajectory of a mobile object, it is however necessary to know all the components of its acceleration and rotation vectors.

The atom interferometers developed to date are sensitive to the inertial effects along only one axis per measurement cycle. This axis is determined by the direction of propagation of light that forms the atomic splitters and mirrors of the interferometer. For example, in the case of an accelerometer or a gravimeter, the device is sensitive to the acceleration along an axis that is parallel to the optical wave vector k.

There exist systems capable of sequentially measuring acceleration and/or rotation components along several axes.

In particular, it is known from document B. Canuel et al. "Six-Axis inertial sensor using cold-atom interferometry", PRL 97, 010402 (2006), an atom interferometry device in which a sequence of three pairs of counter-propagating Raman beams is sequentially applied along three orthogonal directions in space to two clouds of atoms launched along parabolic trajectories to form three atom interferometers and to successively measure the rotation and acceleration components along each of the three orthogonal axes.

It is also known from the document Xuejian Wu et al., "Multiaxis atom interferometry with a single-diode laser and a pyramidal magneto-optical trap", Optica 4, 1545 (2018), a system comprising a magneto-optic trap of pyramidal shape with an apex angle of 90 degrees, into which a cloud of atoms is trapped and to which five pairs of counter-propagating Raman beams are applied: four pairs inclined perpendicularly to each individual face of the pyramid and another pair along the vertical axis passing through the apex, to form the Mach-Zehnder interferometers in butterfly configuration with four pulses ($\pi/2$-$\pi$-$\pi$-$\pi/2$) in such a way as to successively measure the accelerations and rotations along each of the three orthogonal axes.

These atom interferometer systems allow multi-axis inertial measurements. However, these systems require modifying the direction of the optical wave vector k between each measurement sequence or cycle. Therefore, these multi-axis inertial measurements are sequential.

For certain applications, a complete measurement basis along three acceleration and rotation axes is necessary to calculate the trajectory and the orientation of an object in motion. Now, the inertial motions generally vary over time.

It is hence desirable to acquire synchronized inertial measurements to avoid calculation errors.

There exists a need for simultaneous inertial measurements along several orthogonal axes, in a two-dimensional and preferably three-dimensional space.

OBJECT OF THE INVENTION

In order to remedy the above-mentioned drawback of the state of the art, the present invention proposes a multi-axis atom interferometer system. More particularly, it is proposed according to the invention a multi-axis atom interferometer system comprising a source of cold atoms, a temporally modulated laser source to generate a sequence of light pulses comprising at least one first light pulse incident on the source of cold atoms at an initial time t, a second light pulse at a time equal to t+T and a last light pulse at a time equal to t+2T, the first light pulse being configured in such a way as to spatially split the source of cold atoms into at least one first cloud of atoms propagating along a first trajectory along a first axis (X) and one second cloud of atoms propagating along a second trajectory along a second axis (Y), the second axis (Y) being inclined with respect to the first axis (X), the second light pulse being adapted to spatially deflect the first trajectory of at least one part of the first cloud of atoms along the second axis (Y) towards a first point and simultaneously the second trajectory of at least one part of the second cloud of atoms along the first axis (X) towards the first point; the last light pulse being adapted to recombine said at least one part of the first cloud of atoms and said at least one part of the second cloud of atoms at the first point and to form an at least two-dimensional Mach-Zehnder atom interferometer, a detection system configured to measure a first interferometric phase-shift between said at least one part of the first cloud of atoms and said at least one part of the second cloud of atoms, the first interferometric phase-shift being accumulated on said first and second trajectories between the first light pulse and the last light pulse.

This multidimensional geometry makes it possible to simultaneously measure multi-axes accelerations and rotations with a single source of atoms within a single cycle.

These 2D (respectively 3D) pulses are each consisted of two (respectively three) pairs of counter-propagating light beams that induce speed-selective two-photon Raman transitions between two fundamental states of the atom. For each light pulse, the pairs of light beams are orthogonal two-by-two.

Let us consider, for example, the two-dimensional case, where, for each pulse, a pair of beams is aligned along the X-direction and another pair of beams is aligned along the Y-direction. By using a sequence of 2D pulses of the $\pi/2$-$\pi$-$\pi/2$ Mach-Zehnder type, separated by a free fall time T, the atoms are diffracted along two orthogonal trajectories (X and Y). Due to their trajectory, the atoms accumulate a phase difference proportional to the acceleration components $a_x$ and $a_y$, and to the rotation about the perpendicular Z-axis ($\Omega z$). Let us note that this third component is not present in the case of one-dimensional interferometers. When the two trajectories are superposed, the wave packets interfere with each other and the phase difference can be read as a change of the number of atoms in each internal state. The relative number of atoms in an internal state is then sensitive to the three inertial components: $a_x$, $a_y$ and $\Omega_z$. In order to isolate each term, an embodiment of the present disclosure proposes to use simultaneously four 2D interferometers. The four interferometers correspond to four opposite initial directions and come from the same atomic source by using the 2D double-diffraction technique.

The principles can be extended to 3D geometries, where six inertial components ($a_x$, $a_y$, $a_z$, $\Omega_x$, $\Omega_y$ and $\Omega_z$) can be measured thanks to three 2D interferometers in mutually orthogonal planes.

Other non-limitative and advantageous features of the multi-axis atom interferometer system according to the invention, taken individually or according to all the technically possible combinations, are the following:

the first light pulse is split into a first pair of light beams counter-propagating along the first axis (X) towards the source of atoms and another first pair of light beams counter-propagating along the second axis (Y) towards the source of cold atoms, said first pairs of light beams being simultaneously incident on the source of cold atoms at the initial time t;

the second light pulse is split into a second pair of light beams counter-propagating along the first axis (X) and another second pair of light beams counter-propagating along the second axis (Y), said second pairs of light beams being simultaneously incident on said at least one part of the first cloud of atoms and said at least one part of the second cloud of atoms;

the last light pulse is split into a last pair of light beams counter-propagating along the first axis (X) and another last pair of light beams counter-propagating along the second axis (Y) towards the first point, said last pairs of light beams being simultaneously incident on said at least one part of the first cloud of atoms and said at least one part of the second cloud of atoms, at the first point.

Advantageously, the multi-axis atom interferometer system further comprises a signal processing system adapted to extract from the first interferometric phase-shift a first signal function of a first acceleration ($a_x$) of the source of cold atoms along the first axis (X), a second acceleration ($a_y$) along the second axis (Y) and a rotation ($\Omega_z$) about a third axis (Z) inclined with respect to the first axis (X) and to the second axis (Y).

In a particular embodiment, the first light pulse is adapted to spatially split the source of cold atoms by double diffraction into a first packet of atoms and a second packet of atoms propagating in mutually opposed directions along the first axis (X) and/or to spatially split the source of cold atoms by double diffraction into a third packet of atoms and a fourth packet of atoms propagating in mutually opposed directions along the second axis (Y), the second light pulse is adapted to simultaneously deflect a part of the first packet of atoms along the second axis (Y) and a part of the third packet of atoms along the first axis (X) towards the first point, and/or to simultaneously deflect another part of the first packet of atoms along the second axis (Y) and a part of the fourth packet of atoms along the first axis (X) towards a second point, and/or to simultaneously deflect a part of the second packet of atoms along the second axis (Y) and another part of the third packet of atoms along the first axis (X) towards a third point, and/or to simultaneously deflect another part of the second packet of atoms along the second axis (Y) and another part of the fourth packet of atoms along the first axis (X) towards a fourth point, and/or the last light pulse is adapted to recombine at the first point the part of the first packet of atoms and the part of the third packet of atoms forming a first two-dimensional Mach-Zehnder atom interferometer in a first plane (XY), and/or to recombine at the second point the other part of the first packet of atoms and the part of the fourth packet of atoms forming a second two-dimensional Mach-Zehnder atom interferometer in the first plane (XY), and/or to recombine at the third point the part of the second packet of atoms and the other part of the third packet of atoms forming a third two-dimensional Mach-Zehnder atom interferometer in the first plane (XY), and/or to recombine at the fourth point the other part of the second packet of atoms along the second axis (Y) and the other part of the fourth packet of atoms forming a fourth two-dimensional Mach-Zehnder atom interferometer in the first plane (XY); the detection system being adapted to measure at at least three points among the first point, second point, third point and fourth point, respectively: the first interferometric phase-shift of the first atom interferometer and/or a second interferometric phase-shift of the second atom interferometer and/or a third interferometric phase-shift of the third atom interferometer and/or a fourth interferometric phase-shift of the fourth atom interferometer.

According to an aspect of this embodiment, the signal processing system is adapted to extract the first acceleration along the first axis (X), the second acceleration along the second axis (Y) and the rotation about the third axis (Z) by linear combination of at least three among the first interferometric phase-shift, second interferometric phase-shift, third interferometric phase-shift and fourth interferometric phase-shift.

According to another aspect of this embodiment, the detection system includes a spatially resolved image sensor adapted to simultaneously detect at least three among the first interferometric phase-shift, the second interferometric phase-shift, the third interferometric phase-shift and the fourth interferometric phase-shift.

According to a variant, the detection system includes a first detector adapted to detect the first interferometric phase-shift about the first point, a second detector adapted to detect the second interferometric phase-shift about the second point, a third detector adapted to detect the third interferometric phase-shift about the third point and/or a fourth detector adapted to detect the fourth interferometric phase-shift about the fourth point.

According to a 3D embodiment, the first light pulse is further split into a first pair of light beams counter-propagating along the third axis (Z) towards the source of atoms, said first pairs of light beam being simultaneously incident on the source of cold atoms at the initial time t, in such a way as to spatially split the source of cold atoms into the first cloud of atoms propagating along the first axis (X), the second cloud of atoms propagating along the second axis (Y) and a third cloud of atoms propagating along the third axis (Z); the second light pulse being adapted to spatially split and deflect the first cloud of atoms into a first packet of atoms propagating along the second axis (Y) towards a first point and a second packet of atoms propagating along the third axis (Z) towards a second point, and to spatially spit and deflect the second cloud of atoms into a third packet of atoms propagating along the first axis (X) towards the first point and a fourth packet of atoms propagating along the third axis (Z) towards a third point, and to spatially split and deflect the third cloud of atoms into a fifth packet of atoms propagating along the first axis (X) towards a second point and a sixth packet of atoms propagating along the second axis (Y) towards a third point; the last light pulse being adapted to recombine at the first point the first packet of atoms and the third packet of atoms forming a first two-dimensional Mach-Zehnder atom interferometer in a first plane (XY), and to recombine at the second point the second packet of atoms and the fifth packet of atoms forming a second two-dimensional Mach-Zehnder atom interferometer in a second plane (XZ) and to recombine at the third point the fourth packet of atoms and the sixth packet of atoms forming a third two-dimensional Mach-Zehnder atom interferometer in a third plane (YZ), and the detection system being adapted to simultaneously measure the first interferometric phase-shift of the first Mach-Zehnder atom interferometer, a second interferometric phase-shift of the second Mach-Zehnder atom interferometer and a third interferometric phase-shift of the third Mach-Zehnder atom interferometer.

According to a particular aspect of this embodiment, the second light pulse comprises three pairs of light beams adapted to spatially split and deflect the first cloud of atoms into a first packet of atoms propagating along the second axis (Y) towards a first point and a second packet of atoms propagating along the third axis (Z) towards a second point; the second light pulse comprising three other pairs of light beams adapted to spatially split and deflect the second cloud of atoms into a third packet of atoms propagating along the first axis (X) towards the first point and a fourth packet of atoms propagating along the third axis (Z) towards a third point, and the second light pulse also comprising three other pairs of light beams adapted to spatially split and deflect the third cloud of atoms into a fifth packet of atoms propagating along the first axis (X) towards the second point and a sixth packet of atoms propagating along the second axis (Y) towards the third point.

According to another embodiment, the last light pulse being split into two pairs of light beams adapted to recombine at the first point the first packet of atoms and the third packet of atoms forming a first two-dimensional Mach-Zehnder atom interferometer in a first plane (XY), the last light pulse is split into two other pairs of light beams adapted to recombine at the second point the second packet of atoms and the fifth packet of atoms forming a second two-dimensional Mach-Zehnder atom interferometer in a second plane (XZ) and the last light pulse is further split into two other pairs of light beams adapted to recombine at the third point the fourth packet of atoms and the sixth packet of atoms forming a third two-dimensional Mach-Zehnder atom interferometer in a third plane (YZ).

According to a 3D variant of this embodiment, the detection system includes a spatially resolved image sensor adapted to simultaneously detect the first interferometric phase-shift at the first point, the second interferometric phase-shift at the second point and the third interferometric phase-shift at the third point.

According to another 3D variant of this embodiment, the detection system includes a first detector adapted to detect the first interferometric phase-shift at the first point, a second detector adapted to detect the second interferometric phase-shift at the second point and a third detector adapted to detect the third interferometric phase-shift at the third point.

The invention also relates to a multi-axis atom interferometry method comprising the following steps:
generating a source of cold atoms;
generating a sequence of light pulses comprising at least one first light pulse incident on the source of cold atoms at an initial time t, a second light pulse at a time equal to t+T and a last light pulse at a time equal to t+2T;
the first light pulse being configured in such a way as to spatially split the source of cold atoms into at least one first cloud of atoms propagating along a first trajectory along a first axis (X) and one second cloud of atoms propagating along a second trajectory along a second axis (Y), the second axis (Y) being inclined with respect to the first axis (X);
the second light pulse being adapted to spatially deflect the first trajectory of at least one part of the first cloud of atoms along the second axis (Y) towards a first point and simultaneously the second trajectory of at least one part of the second cloud of atoms along the first axis (X) towards the first point;
the last light pulse being adapted to recombine said at least one part of the first cloud of atoms and said at least one part of the second cloud of atoms at the first point and to form an at least two-dimensional Mach-Zehnder atom interferometer;
detecting at least one first interferometric phase-shift between said at least one part of the first cloud of atoms and said at least one part of the second cloud of atoms, the first interferometric phase-shift being accumulated on said first and second trajectories between the initial time t and the time t+2T.

The multi-axis atom interferometer system makes it possible to diffract atoms according to a 2D or 3D trajectory, and to generate atomic interferences at several positions in space. The multi-axis atom interferometer system makes it possible to create several interferometers simultaneously from the same atomic source and hence to increase the effective area and the whole sensitivity to the inertial effects. It makes it possible to simultaneously measure several inertial effects using a spatially resolved detection method to separately detect the different clouds of atoms. Such a multi-axis atom interferometer system makes it possible to isolate different acceleration or rotation components using different linear combinations of the inertial phases obtained for opposite initial orientations. It makes it possible to reject the relative phase noise of the laser between two pairs of orthogonal beams as well as the systematic effects between neighbour interferometers, by using a common mode rejection. It makes it possible to measure rotations without initially launching the atoms. Instead, the launching corresponds to the first 2D pulse. The initial launching speed can be known with an accuracy as good as the wavelength of the laser (typically 1 part per billion). The direction of the initial launching speed can be easily changed by changing the sign of the two wavevectors used in the 2D pulse. This multi-axis atom interferometer system makes it possible to eliminate the launching-speed and acceleration dependence in the rotation-sensitive phase measurement thanks to the common mode rejection.

That way, an atomic gyroscope can benefit from the same absolute accuracy as the cold atom accelerometers because all the quantities that appear in the rotation-sensitive inertial phase are accurately known.

The invention is particularly interesting for the inertial navigation applications, in which significant rotation and acceleration variations between measurement cycles compromise the common mode rejection in the case of a sequential measurement. The invention also proposes an atom interferometer system in which:
each light pulse simultaneously deflects or diffracts a cloud of atoms along two or three axes, determined by the respective wavevectors of each light field;
a measurement device adapted to interact, simultaneously and in a spatially separated manner, on the one hand, with the first packet of atoms in a first area of space and, on the other hand, with the second packet of atoms in a second area of space, the first area of space and the second area of space being disjoint, to deduce therefrom an instantaneous signal representative of a first acceleration along the first axis (X), a second acceleration along the second axis (Y) and a rotation about a third axis (Z) inclined with respect to the first axis (X) and the second axis (Y).

the light source system is adapted to generate another first pair of light beams counter-propagating along the third axis (Z) towards the source of atoms, and wherein said first pairs of light beams are synchronized and have the same duration along the three axes (X, Y, Z), in such a way as to simultaneously split the source of cold atoms into a first packet of atoms along the first axis (X), a second packet of atoms along the second axis (Y) and a third packet of atoms along the third axis (Z);

a measurement device adapted to interact, simultaneously and in a spatially separated manner, with the first packet of atoms in a first area of space, the second packet of atoms in a second area of space and the third packet of atoms in a third area of space, the first area of space, the second area of space and the third area of space being disjoint two-by-two, to further deduce therefrom a signal representative of a first acceleration along the first axis (X), a second acceleration along the second axis (Y) and a rotation about a third axis (Z) inclined with respect to the first axis (X) and the second axis (Y).

DETAILED DESCRIPTION OF AN EXEMPLARY EMBODIMENT

The following description in relation with the appended drawings, given by way of non-limitative examples, will allow a good understanding of what the invention consists of and of how it can be implemented.

In the appended drawings:

FIG. 1 schematically shows an embodiment of a two-dimensional atomic splitter comprising two pairs of light beams incident on a source of cold atoms, these two pairs coming from a single and same first pulse and being adapted to spatially split the source of cold atoms into two clouds of atoms propagating along two mutually transverse directions;

FIG. 2 schematically shows the levels of energy and optical frequencies of each of the 4 light beams of FIG. 1;

FIG. 3 shows the evolution of the levels of population of the initial stationary atomic state $|1,0,0\rangle$ towards the atomic states $|2,\hbar K_x,0\rangle$ and $|2,0,\hbar K_y\rangle$ as a function of the area of the first pulse of FIG. 1;

FIG. 4 schematically shows an embodiment of a two-dimensional atomic mirror comprising two other pairs of light beams coming from a second pulse and adapted to spatially deflect a cloud of atoms along a direction inclined with respect to the initial direction;

FIG. 5 shows the evolution of the levels of population between an atomic state $|2,0,\hbar K_y\rangle$ and the atomic states $|1,0,0\rangle$, $|2,\hbar K_x,0\rangle$ as a function of the area of the two pairs of transverse beams of FIG. 4;

FIGS. 6A-6B-6C schematically show a two-dimensional Mach-Zehnder interferometer according to an embodiment, wherein FIG. 6A shows a two-dimensional atomic splitter, FIG. 6B shows a two-dimensional atomic mirror and FIG. 6C shows a two-dimensional atomic recombination device;

FIGS. 8-10 show an embodiment of a three-dimensional Mach-Zehnder interferometer, wherein FIG. 8 shows a three-dimensional atomic splitter, FIG. 9 shows a three-dimensional atomic mirror and FIG. 10 shows a three-dimensional atomic recombination device;

FIGS. 11-13 show another embodiment of a spatially resolved, three-dimensional Mach-Zehnder interferometer, wherein FIG. 11 shows a three-dimensional atomic splitter, FIG. 12 shows three three-dimensional atomic mirrors and FIG. 13 shows three two-dimensional atomic recombination devices.

DEVICE

The present disclosure proposes a new geometry of a multidimensional atom interferometer sensitive to the accelerations and rotations along several directions in space simultaneously, with a single measurement. This measurement comprises at least two spatial components of the acceleration vector (2D or 3D) and/or of the rotation vector (2D or 3D).

A new model of three-dimensional atomic optics will be described. The basic blocks of different embodiments of multidimensional, and more precisely two-dimensional (2D) or three-dimensional (3D), atom interferometers, will also be described.

In the present document, it is meant by multidimensional geometry a geometry in which at least one light pulse exchanges a momentum with atoms along more than one direction at a time. A sequence of light pulses can be used to separate, spatially deflect and recombine the atoms along at least two axes. This multidimensional geometry allows a multi-axis inertial measurement in only one cycle. By axis inclined with respect to another axis, it is meant axes that are not parallel to each other, the inclination angle being higher than 0 and lower than or equal to 90 degrees. Preferably, axes inclined with respect to each other are orthogonal to each other.

Examples of basic blocks of different embodiments of two-dimensional and three-dimensional atom interferometers will be described in more detail.

FIGS. 1 to 6 show an example of basic blocks for a two-dimensional atom interferometer according to one embodiment. The basic blocks are consisted of an atomic splitter, an atomic mirror and an atomic recombination device by analogy with the components of the Mach-Zehnder optical interferometer.

Figure 1:
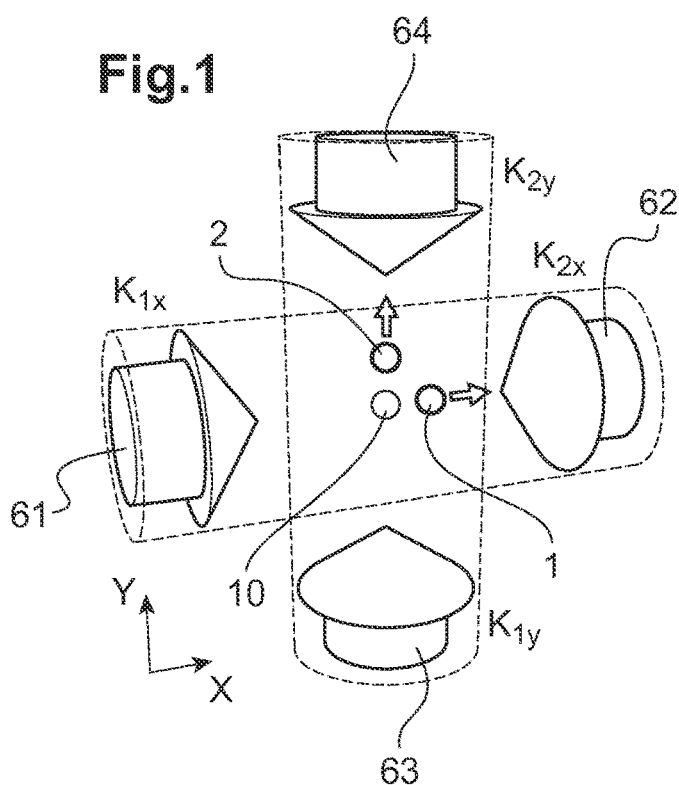
Figure 2:
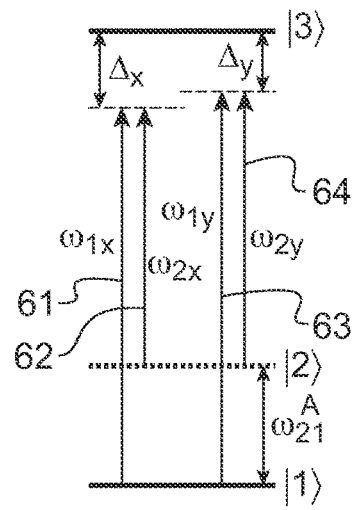

In FIG. 1 is shown a source 10 of cold atoms in an atomic state $|1,0,0\rangle$, also called fundamental state of these cold atoms, denoted state $|1\rangle$ in FIG. 2. By source of cold atoms, it is here meant a cloud of atoms located at a point in space of coordinates (0, 0, 0) in an orthonormal coordinate system (X, Y, Z). The cold atoms 10 are for example rubidium (Rb), caesium (Cs), potassium (K) or strontium (Sr) atoms. At an initial time, the cold atoms 10 all have a same initial speed and propagate in a same direction. In certain embodiments, the initial speed is zero and, in other embodiment, it is non-zero. A single source 10 of cold atoms is used.

A light pulse is applied simultaneously with a first pair of light beams 61 and 62 along the X-axis and another first pair of light beams 63 and 64 along the Y-axis. In the following of the present document, the first pair of light beams (61,62), and other first pair of light beams (63, 64) are generated from a single and same first laser pulse. It is meant by simultaneously applied pulses, pulses that are switched on at the same time and switched off at the same time on the different axes. The X- and Y-axes are here the axes of an orthonormal XY coordinate system, approximately in the plane of FIG. 1. The light beams 61 and 62 are counter-propagating along the X-axis and, respectively, the light beams 63 and 64 are counter-propagating along the Y-axis, in such a way that the two pairs of light beams 61,62 and 63, 64 are simultaneously incident on the source 10 of cold atoms at an initial time t. In other words, the light beams 61 and 62 have a wavevector parallel to the X-axis and the light beams 63 and 64 have a wavevector parallel to the Y-axis. The light beams 61,62 and 63, 64 are generally laser beams.

Along the X-axis, the light beam 61, respectively 62, has a wavevector k1x, respectively k2x, and an optical frequency ω1x, respectively ω2x. Along the Y-axis, the light beam 63, respectively 64, has a wavevector k1y, respectively k2y, and an optical frequency ω1y, respectively ω2y. The pair of light beams 61, 62 excites a two-photon Raman transition between two internal atomic states separated by a frequency ω1x−ω2x~$ω^A_{21}$. Simultaneously, the pair of light beams 63, 64 excites a two-photon Raman transition between two internal atomic states separated by a frequency coly ω1y−ω2y~$ω^A_{21}$.

During this process, a momentum ℏKx=ℏ(k1x−k2x)~2ℏkx, non-zero, is transferred to a first cloud of atoms 1 diffracted in the X-direction and a momentum ℏKy=ℏ(k1y−k2y)~2ℏky, non-zero, is transferred to a second cloud of atoms 2 diffracted in the Y-direction, where h is the reduced Planck constant. In other words, the source 10 of cold atoms, initially in the stationary state |1,0,0⟩, in the reference system of the laser wave front, is equally split into a first cloud of atoms 1 having a state of motion |2,ℏ$K_x$,0⟩ along the X-axis and a second cloud of atoms 2 having a state of motion |2,0,ℏ$K_y$⟩ along the Y-axis. That way, the two pairs of light beams 61, 62 and 63, 64 couple two states of motion |2,ℏ$K_x$,0⟩ and |2,0,ℏ$K_y$⟩ to the stationary state |1,0,0⟩. When the difference k1x−k2x is positive, the pair of light beams 61, 62 transfers a non-zero momentum in the +X-direction and, simultaneously, when the difference k1y−k2y is positive, the pair of light beams 63, 64 transfers a momentum in the +Y-direction. Conversely, when the difference k1x−k2x is negative, the pair of light beams 61, 62 transfers a non-zero momentum in the −X-direction and, simultaneously, when the difference k1y−k2y is negative, the pair of light beams 63, 64 transfers a momentum in the −Y-direction. The person skilled in the art will easily deduce therefrom the motion combinations along the +X and −Y directions or, respectively −X and +Y, which are also possible.

FIG. 2 shows the levels of energy and optical frequency for each light beam 61, 62, 63, 64. For each pair of light beams, (61, 62) and (63, 64), the two internal states |1⟩ and |2⟩ are coupled through an intermediate state |3⟩. More precisely, the detuning between ω1x and the transition ω13 between the internal states |1⟩ and |3⟩ is denoted Δx. The detuning between ω1y and the transition ω13 between the internal states |1⟩ and |3⟩ is denoted Δy. It is preferably chosen Δy≠Δx in order to avoid the excitation or spurious resonances, for example Δx=−1 GHz and Δy=−1.1 GHz.

The states |1,0,0⟩, |2,ℏ$K_x$,0⟩ and |2,0,ℏ$K_y$⟩ are considered as eigenstates of a 3-level effective system: |Ψ⟩=$C_0$|1,0,0⟩+$C_x$|2,ℏKx,0⟩+$C_y$|2,0,ℏKy⟩. The dynamics of this two-dimensional (2D) diffraction process can be described as a quasi-Rabi oscillation between the states of this system, where the vector containing the respective amplitudes C=($C_0$,$C_x$,$C_y$) evolves according to the following equation (1):

$$C(t) = \exp\left[-i\begin{pmatrix} 0 & X_x^* & X_y^* \\ X_x & -\delta_x & 0 \\ X_y & 0 & -\delta_y \end{pmatrix} t\right] C(0) \quad (1)$$

where $X_x$, respectively $X_y$, represents the two-photon Rabi frequency for the X-axis, respectively for the Y-axis, and $\delta_x = \omega_{1x} - \omega_{2x} - \omega^A_{21} - \Delta\omega^D_x - \Delta\omega^R_x$ represents the detuning of the two-photon transition of the pair of beams (61, 62), respectively, $\delta_y = \omega_{1y} - \omega_{2y} - \omega^A_{21} - \Delta\omega^D_y - \Delta\omega^R_y$ for the pair of beams (63, 64). We emphasise that the transitions induced by each pair of beams are speed-selective, with the speed denoted v, as indicated by the presence of the Doppler detuning $\Delta\omega^D_x = K_x v$ and the frequency associated with the recoil $\Delta\omega^R_x = \hbar K^2_x/2m$ in the expression of $\delta_x$ and, respectively, of the Doppler detuning $\Delta\omega^D_y = K_y v$ and the frequency associated with the recoil $\Delta\omega^R_y = \hbar K^2_y/2m$ in the expression of $\delta_y$.

In the case where $\delta_x = \delta_y = \delta$, the effective Raby frequency for two-dimensional diffraction, $\Omega_{Rabi}$, takes a simple analytic form:

$$\Omega_{Rabi} = \frac{1}{2}\sqrt{\delta^2 + 4(|\chi_x|^2 + |\chi_y|^2)} \quad (2)$$

Figure 3:
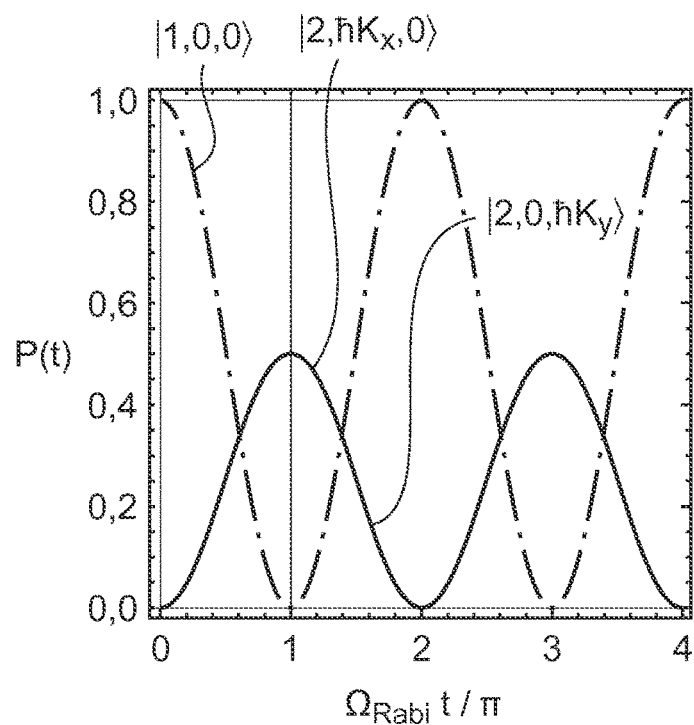

FIG. 3 represents, as a function of the duration or the area of the pulses, the Rabi oscillations between the fundamental state |1⟩ and the two states |2,ℏ$K_x$,0⟩ and |2,0,ℏ$K_y$⟩, where ℏ is the reduced Planck constant in the case where δx=δy. In this case, the curves of the two states |2,ℏ$K_x$,0⟩ and |2,0,ℏ$K_y$⟩ are in perfect superposition.

These Rabi oscillations induce a transfer of population between the stationary state and the states of motion for a source of atoms initially at rest in state |1,0,0⟩. A 2D atomic splitter is obtained at a duration τ corresponding to a light pulse having an area equal to: $\Omega_{Rabi}\cdot\tau = \pi/2$. In this case, the atomic population is equally transferred towards the two states of motion |2,ℏ$K_x$,0⟩ and |2,0,ℏ$K_y$⟩.

Contrary to the case of an atomic splitter operating by single one-dimensional (1D) diffraction, where a superposition of equal intensity (or 50-50) of the initial and final states is generally desired, there is no population of atoms left in the initial state. A 1D single-diffraction atomic splitter (according to the prior art) transfers a momentum via two photons in a single direction and the internal states of the atoms are changed (e.g. |1,0,0> becomes |2,+hKx,0>). A 1D double-diffraction atomic splitter (according to the prior art) involves a four-photon symmetrical motion transfer in a single direction and the atoms remain in the same internal state (e.g. |1,0,0> becomes |1,+hKx,0>+|1,−hKx,0>).

According to the present disclosure, a 2D single-diffraction atomic splitter involves a four-photon total motion transfer (or two transfers along two directions, e.g. |1,0,0> becomes |2,+hKx,0>+|2,0,+hKy>), however the internal states of the atoms are changed. Unlike a 1D atomic splitter, with a 2D atomic splitter, the atoms are split into two states that move in different spatial directions. In FIG. 3, the atomic population is transferred by 2D single-diffraction, where a momentum that corresponds to two photons is transferred simultaneously along the X- and Y-directions.

The present disclosure further proposes a 2D double-diffraction splitter, which involves a eight-photon symmetrical motion transfer (2 along 4 directions, e.g. |1,0,0⟩ becomes |2,+ℏKx,0⟩+|2,0,+ℏKy⟩+|2,−ℏKx,0⟩+|2,0,−ℏKy⟩).

Figure 4:
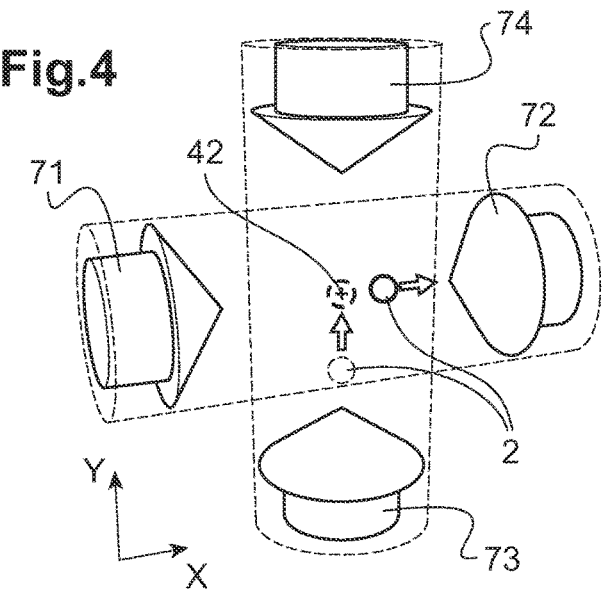

In FIG. 4 is shown the second cloud of atoms 2 propagating along the Y-direction in state |2,0,ℏ$K_y$⟩. A second pair of light pulses 71 and 72 along the X-axis and another second pair of light beams 73 and 74 along the Y-axis are simultaneously applied. The second pair of light beams (71, 72) and other pair of light beams (73, 74) come from a single and same second light pulse. The light pulses 71 and 72 are counter-propagating along the X-axis and, respectively, the light beams 73 and 74 are counter-propagating along the Y-axis, so that the second pairs of light beams (71,72) and (73, 74) are simultaneously incident on the second cloud of atoms 2 at point 42 in space. In other words, the light beams 71 and 72 have a wavevector $K_x$ parallel to the X-axis and the light beams 73 and 74 have a wavevector $K_y$ parallel to the Y-axis. During this process, a momentum ℏ$K_y$, non-zero, is transferred to the first cloud of atoms 1 diffracted in the Y-direction and a momentum ℏ$K_x$, non-zero, is transferred to the second cloud of atoms 2 diffracted in the X-direction.

A 2D single-diffraction atomic mirror is hence formed. This 2D single-diffraction atomic mirror stops the motion of the atoms in one direction and imparts them a motion in another direction. For example, in FIG. 4, the 2D atomic mirror simultaneously transfers to the initial state |2,0,+hKy⟩ a momentum −hKy and +hKx, which gives the final state |2,+hKx,0⟩.

On the contrary, a 1D single-diffraction atomic mirror according to the prior art transmits a momentum in a single direction.

Figure 5:
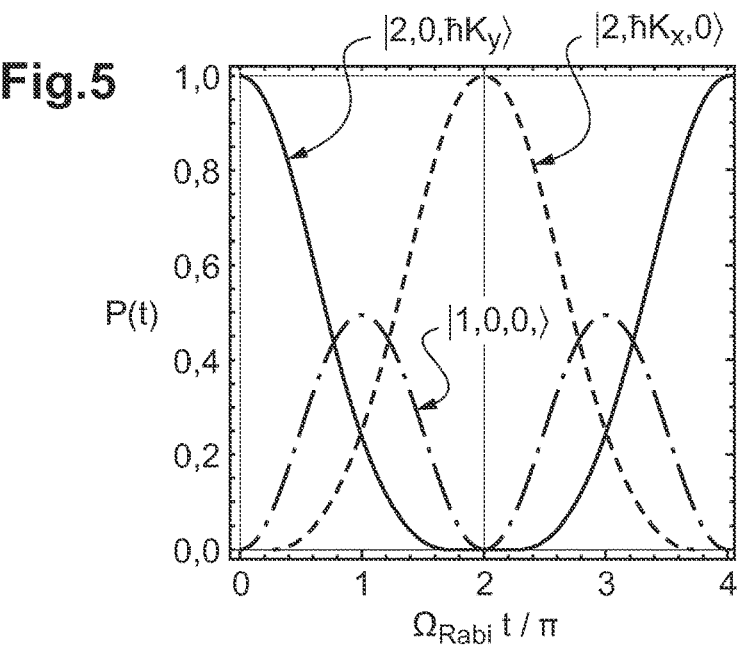

FIG. 5 shows the Rabi oscillations for two pairs of light beams forming the equivalent of a 2D atomic mirror, where the cloud of atoms 2 initially in state |2.0,ℏ$K_y$⟩ is integrally transferred, by 2D single-diffraction, to state |2,ℏ$K_x$,0⟩ for a pulse of duration 2τ, in other words for a second light pulse having an area equal to π. In these conditions, in FIG. 4, the cloud of atoms 2 is deflected in the X-direction. We emphasize that this transfer of population is made through the stationary state |1,0,0⟩ that oscillates at twice the frequency of the states in motion.

Similarly, by applying the two pairs of light beams (71,72) and (73, 74) to the first cloud of atoms 1 propagating in the X-direction, for a pulse duration equal to 2τ, in other words for a second light pulse having an area equal to π, the first cloud of atoms 1 in state |2, ℏ$K_x$,0⟩ is integrally transferred, by 2D single-diffraction, to state |2,0, ℏ$K_y$⟩. In other words, the first cloud of atoms 1 is deflected in the Y-direction.

The set of second pair of light beams (71, 72) and other second pair of light beams (73, 74) hence forms a two-dimensional atomic mirror.

By symmetry with the 2D atomic splitter, described in connection with FIGS. 1 to 3, from a first cloud of atoms 1 in state |2,0, ℏ$K_y$⟩ and a second cloud of atoms 2 in state |2, ℏ$K_x$,0⟩ moving towards a same point in space, the application of the set of two other pairs of beams (81,82) and (83,84) along the X- and Y-axes at this point in space, these third pair of light beams (81,82) and other third pair of light beams (83,84) coming from a single and same third light pulse of duration equal to τ, in other words, having an area equal to π/2, forms an atomic recombination device (see FIG. 6C). During this process, a momentum −ℏ$K_y$, non-zero, is transferred to the first cloud of atoms 1 and a momentum −ℏ$K_x$, non-zero, is transferred to the second cloud of atoms 2. As a function of the interferometer phase, a part of the atoms is transferred, by 2D single-diffraction, to the fundamental state |1,0,0⟩ and/or to state |2, ℏ$K_x$,0⟩, respectively |2,0, ℏ$K_y$⟩. More precisely, when the phase difference of the interferometer is equal to an odd multiple of π, the two clouds of atoms 1 and 2 are integrally deviated in equal parts the two X- and Y-directions. When the phase difference of the interferometer is equal to an odd multiple of π/2, the two clouds of atoms 1 and 2 are integrally transferred to the stationary fundamental state. When the phase difference of the interferometer is non-zero, a part of the first cloud of atoms 1 is also deviated in the two X- and Y-directions, the other part of the first cloud of atoms is transferred to the stationary fundamental state and, simultaneously, a part of the second cloud of atoms 2 is also deviated along the two X- and Y-directions, the other part of the second cloud of atoms is transferred to the stationary fundamental state.

An important element of any atomic optical device is the transfer of a "classical" phase to the atoms. In the case of a light-pulse atom interferometer, this is the phase difference between the excitation beams. To clarify the role of these phases in the case of the 2D atomic optics, the case of pairs of on-resonance beams (δx=δy=0) having identical Rabi frequencies is considered. The effect of the 2D splitters and mirrors can hence be summarized as follows. Let us note $\phi_x$, respectively $\phi_y$, the optical phase difference between the counter-propagating Raman beams along the X-axis, respectively Y-axis. The effect of a 2D atomic splitter, or a 2D atomic recombination device, is to impart a phase difference ±$\phi_x$, respectively ±$\phi_y$, to the atoms initially in the stationary state and transferred to a state of motion along the ±X-direction, respectively ±Y-direction, and vice versa. The effect of a 2D atomic mirror is to impart a phase difference ±($\phi_x$−$\phi_y$) to the atoms that perform a transition between two states of motion |2, ℏ$K_x$,0⟩ and |2, ℏ$K_y$,0⟩.

The above-described basic blocks, atomic splitter, atomic mirror and atomic recombination device, make it possible to construct a two-dimensional Mach-Zehnder atom interferometer.

According to an embodiment, the two-dimensional Mach-Zehnder interferometer includes a sequence of three light pulses of respective durations τ, 2τ and τ, separated by a time of interrogation T. The first pulse forms an atomic splitter, the second pulse forms an atomic mirror and the third pulse forms an atomic recombination device. The following matrix product provides a simple representation of this process:

$$\mathbb{M}_{MZ} = \mathbb{M}_3(\tau)\, \mathbb{U}_{free}(T)\, \mathbb{M}_2(2\pi)\, \mathbb{U}_{free}(T)\, \mathbb{M}_1(\tau) \quad (3)$$

where $U_{free}(T)$ is a unit matrix describing the free evolution during the time T between the consecutive light pulses of a same sequence.

For a cloud of atoms initially a rest that acquires the phase $\phi_{x,n}$ or $\phi_{y,n}$ during the $n^{th}$ pulse, where n=1, 2 or 3, the populations are given by the following equation (4):

$$\begin{pmatrix} |C_0|^2 \\ |C_x|^2 \\ |C_y|^2 \end{pmatrix} = \begin{pmatrix} \frac{1}{2}(1+\cos\Delta\Phi) \\ \frac{1}{4}(1-\cos\Delta\Phi) \\ \frac{1}{4}(1-\cos\Delta\Phi) \end{pmatrix} \quad (4)$$

where Δϕ represents the full phase difference of the interferometer, defined as follows in two dimensions $\Delta\phi \equiv (\phi_{x,1} - 2\phi_{x,2} + \phi_{x,3}) - (\phi_{y,1} - 2\phi_{y,2} + \phi_{y,3})$.

Equation (4) indicates that the interferometer has two complementary output ports: a port where the population is in the stationary state $|\langle 1|M_{MZ}|1,0,0\rangle|^2 = \frac{1}{2}(1+\cos\Delta\phi)$ and another port with the sum of the populations in the states of motion $|\langle 2|M_{MZ}|1,0,0\rangle|^2 = \frac{1}{2}(1-\cos\Delta\phi)$. These two ports are spatially separated and correspond to different internal states. One of the output ports corresponds to the stationary state and the other output port corresponds to the sum of the clouds moving along X or Y. The two output ports of the 2D Mach-Zehnder atom interferometer can be measured separately by means of a spatially resolved imaging system. As an alternative, they may be measured by means of a single photodetector by selectively sending a resonant light with one port but not with the other, and integrating over the space. These two methods can be carried out with thermal clouds of atoms.

FIG. 6 schematically shows a two-dimensional Mach-Zehnder interferometer according to an embodiment. Here again, a single source 10 of cold atoms is used.

Figures 6A, 6B, 6C:
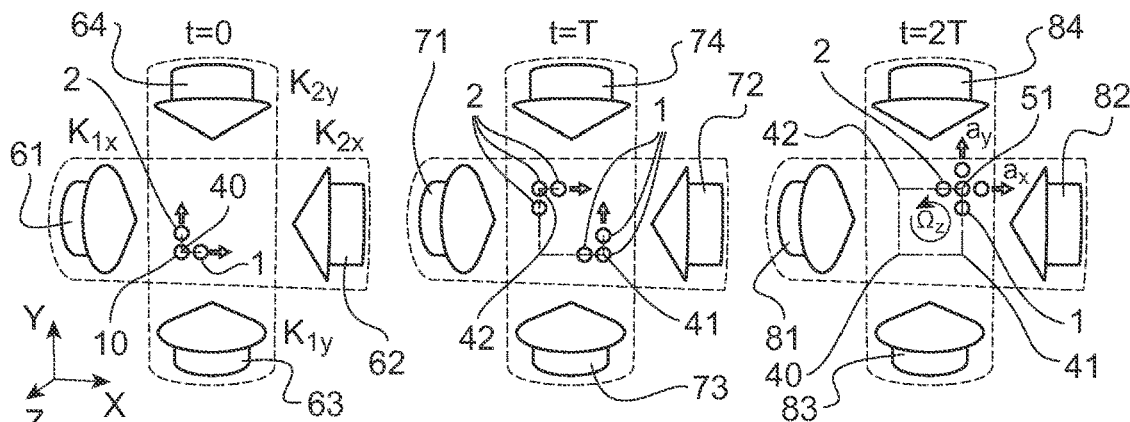

More precisely, FIG. 6A shows a two-dimensional atomic splitter at a time t=0, similar to FIG. 1. A first pair of light beams (61,62) counter-propagating along the X-axis and another first pair of light beam (63, 64) counter-propagating along the Y-axis are simultaneously applied to the source 10 of cold atoms. The first pulse split into beams (61,62) and (63, 64) has a duration τ adapted to spatially split the source 10 of cold atoms into a first cloud of atoms 1 propagating along a first trajectory along the X-axis and a second cloud or atoms 2 propagating along a second trajectory along the Y-axis. Just after the first light pulse, all the cold atoms of the source 10, which were initially in the fundamental state are split by 2D single-diffraction either in the X-direction to form the first cloud of atoms 1 or in the Y-direction to form the second cloud of atoms 2. As in the embodiment described in relation with FIG. 1, after the first pulse, there is no population of atoms left in the initial or fundamental state.

FIG. 6B represents a two-dimensional atomic mirror, at a time t=T. A second pair of light beams (71, 72) counter-propagating along the X-axis and another second pair of light beams (73, 74) counter-propagating along the Y-axis are simultaneously applied to the first cloud of atoms 1 propagating along the X-axis and to the second cloud of atoms 2 propagating along the Y-axis. The light beams here have a sufficient spatial extent to simultaneously cover the first cloud of atoms 1 and the second cloud of atoms 2. The second pair of counter-propagating light beams (71,72) and other second pair of counter-propagating light beams (73, 74) come from a single and same second light pulse having a duration 2τ. Hence, the first cloud of atoms 1 is reflected, by 2D single-diffraction, along the Y-direction at point 41 and, simultaneously, the second cloud of atoms 2 is reflected, by 2D single-diffraction, along the X-direction at point 42.

FIG. 6C shows a two-dimensional atomic recombination device, at a time t=2T. A third pair of light beams (81,82) counter-propagating along the X-axis and another third pair of light beams (83, 84) counter-propagating along the Y-axis are simultaneously applied to the first cloud of atoms 1 propagating along the Y-axis and to the second cloud of atoms 2 propagating along the X-axis. The third pairs of counter-propagating light beams (81,82) and (83, 84) come from a single and same third light pulse having a duration τ. Hence, the first cloud of atoms 1 and the second could of atoms 2 recombine each other at point 51 in space.

The two so-formed arms of the 2D Mach-Zehnder atom interferometer surround a rectangular area in the XY-plane. This geometry is sensitive to a rotation about the Z-axis perpendicular to the XY-plane. Moreover, projected onto the spatiotemporal xt- and yt-planes, these paths surround the same spatiotemporal area as a 1D Mach-Zehnder interferometer, hence providing a sensitivity to the acceleration components $a_x$ along the X-axis and $a_y$ along the Y-axis.

More generally, the atomic trajectories surround both a spatial area and a spatiotemporal area. Such a 2D Mach-Zehnder atom interferometer is sensitive both the accelerations, $a_x$ along the X-axis and $a_y$ along the Y-axis, and to a rotation $\Omega_z$ about the Z-axis. This 2D Mach-Zehnder atom interferometer geometry combines an accelerometer and a gyroscope.

The dynamics resulting from the interference between two 2D atomic trajectories is encoded into the phase difference ΔΦ of this interferometer. This phase difference of the 2D Mach-Zehnder geometry is calculated based on the ABCDξ formalism developed by Bordé and Antoine. This processing provides an exact solution of an atomic wave packet in the presence of an external time-dependent Hamiltonian at most quadratic in position and momentum. This type of Hamiltonian contains of all the important physics for the atom interferometry applications (accelerations, rotations and gravity gradients). Briefly, ΔΦ can be written as follows:

$$\Delta\Phi = \sum_{i=1}^{N} (K_i^U - K_i^L) \cdot Q_i + \phi_i^U - \phi_i^L \qquad (5)$$

where $K_i^U$ and $K_i^L$ are effective wavevectors corresponding to the transfer of momentum by the light pulses along the upper (U) and lower (L) paths, respectively, and $Q_i = \frac{1}{2}(q^U(t_i)+q^L(t_i))$ is the position on the average trajectory during the $i^{th}$ pulse at time $t=t_i$. $\phi_i^U$ and $\phi_i^L$ are the optical phases controllable by lasers. Equation (5) establishes that the interferometric phase is only determined by the phase imparted to the atoms by the light pulses along the average trajectory at the times $t_1, t_2, \ldots, t_N$. This relation is verified experimentally at a high degree of accuracy. The atomic trajectory, in position and speed, described by the vectors q and p, is calculated by solving the classical equations of motion.

In the case of a one-dimensional MZ interferometer, the total phase shift is expressed as follows:

$$\Delta\Phi_{x,0} = K_x(a_x + 2v_y\Omega_z - 2v_z\Omega_y)T \qquad (6)$$

This well known phase shift of a one-dimensional MZ interferometer is proportional to the sum of the external acceleration, $a_x$, and the Coriolis acceleration, $(2v\times\Omega)_x$, along the X-axis.

In the case of a two-dimensional MZ interferometer, the total phase shift is expressed as follows:

$$\Delta\Phi_{x,y} = K_x(a_x + 2\ v_y\ \Omega_z - 2\ v_z\ \Omega_y)T^2 - \qquad (7)$$
$$K_y(a_y + 2\ v_x\ \Omega_z - 2\ v_z\ \Omega_x)T^2 + 2\frac{\hbar}{m}K_x\ K_y\ \Omega_z T^2$$

It is observed that the phase-shift of the 2D interferometer of the present disclosure is not only proportional to the total acceleration along the X-axis, which comprises the external acceleration, $a_x$, and the Coriolis acceleration, $(2v\times\Omega)_x$, but also proportional to the total acceleration along the Y-axis and the speed of rotation $\Omega_z$ about the Z-axis. The phase associated to the rotation about the Z-axis takes the usual form $\Delta K$ $(2v \times \Omega)T^2$, where v is herein the recoil speed defined by the formula $\hbar(K_1^U + K_1^L)/2m$. The recoil speed corresponds to the recoil taken by an atom when it absorbs a photon $k_1^U$ and emits a photon $k_1^L$. Contrary to the atomic gyroscopes of the prior art, here, no initial speed is required to obtain a sensitivity to the rotation Viz. This aspect is particularly advantageous, because it is then possible to change the direction of the speed v by inverting $K_1^U$ and $K_1^L$, in such a way as to eliminate the spurious accelerometric phase-shifts that represent one of the main sources of systematic error in the atomic gyroscopes.

Figure 7:
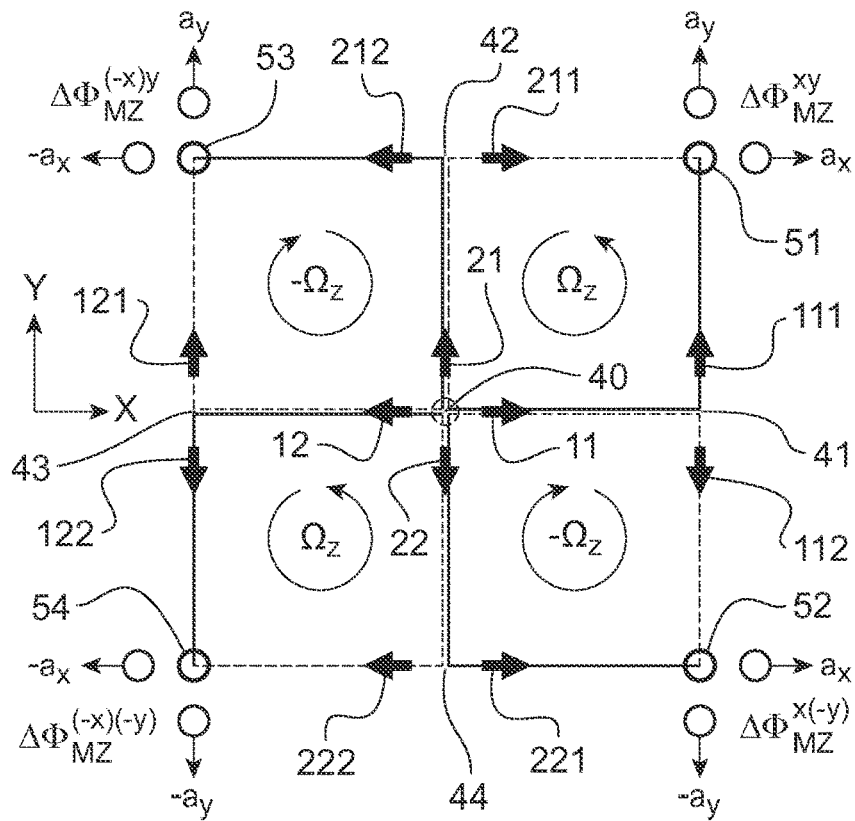
FIG. 7 shows a simultaneous system of four two-dimensional Mach-Zehnder interferometers arranged symmetrically in a same plane and using a same source of cold atoms.

FIG. 7 represents a system of four two-dimensional Mach-Zehnder interferometers formed symmetrically in a same plane and using a same source of cold atoms. In this embodiment, quadruple-diffraction (or two-dimensional double-diffraction) light pulses are used to simultaneously transfer a momentum $\pm \hbar K$ along each X- and Y-axis. More precisely, a source 10 of cold atoms is initially located at point 40. A first pulse splits, by 2D double-diffraction, the source 10 of cold atoms into four clouds of atoms: a first cloud of atoms 11 propagating along the X-axis with a wavevector $+K_x$, a second cloud of atoms 12 propagating along the X-axis with a wavevector $-K_x$, a third cloud of atoms propagating along the Y-axis with a wavevector $+K_y$, and a fourth cloud of atoms propagating along the Y-axis with a wavevector $-K_y$. After a duration T, the first cloud of atoms is at point 41, the second cloud of atoms is at point 43, the third cloud of atoms is at point 42 and the fourth cloud of atoms is at point 44. As in the embodiments described in relation with FIGS. 1 and 4, after the first pulse, there is no population of atoms left in the initial or fundamental state.

At time t=T, a second light pulse is simultaneously applied to points 41, 42, 43 and 44. More precisely, the second pulse uses a combination of two-dimensional single-diffraction and the two-dimensional double-diffraction effect. Hence, the first cloud of atoms 11 is diffracted at point 41 into a packet of atoms 111 propagating along the Y-axis with a wavevector $+K_y$ and another packet of atoms 112 propagating along the Y-axis with a wavevector $-K_y$, respectively. Similarly, the second cloud of atoms 12 is diffracted at point 43 into a packet of atoms 121 propagating along the Y-axis with a wavevector $+K_y$ and another packet of atoms 122 propagating along the Y-axis with a wavevector $-K_y$, respectively. The third cloud of atoms 21 is diffracted at point 42 into a packet of atoms 211 propagating along the X-axis with a wavevector $+K_x$ and another packet of atoms 212 propagating along the X-axis with a wavevector $-K_x$, respectively. And, the fourth cloud of atoms 22 is diffracted at point 44 into a packet of atoms 221 propagating along the X-axis with a wavevector $+K_x$ and another packet of atoms 222 propagating along the X-axis with a wavevector $-K_x$, respectively.

A the time t=2T, a third light pulse is simultaneously applied to points 51, 52, 53 and 54 located at the ends of the large square of FIG. 7. More precisely, the third light pulse uses the two-dimensional single-diffraction. Hence, the packet of atoms 111 and the packet of atoms 211 recombine with each other at point 51 to form a first Mach-Zehnder interferometer in the XY-plane or "xy" interferometer measuring a phase shift $\Delta \Phi_{x,y}$. The packet of atoms 112 and the packet of atoms 221 recombine with each other at point 52 to form a second Mach-Zehnder interferometer in the XY-plane or "x,-y" interferometer measuring a phase shift $\Delta \Phi_{x,-y}$. The packet of atoms 212 and the packet of atoms 121 recombine with each other at point 53 to form a third 2D Mach-Zehnder interferometer in the XY-plane or "-x, y" interferometer measuring a phase shift $\Delta \Phi_{-x,y}$. The packet of atoms 122 and the packet of atoms 222 recombine with each other at point 54 to form a fourth 2D Mach-Zehnder interferometer in the XY-plane or "-x, -y" interferometer measuring a phase shift $\Delta \Phi_{-x,-y}$.

Although the phase of each of these 2D Mach-Zehnder interferometers is a mixture of three inertial measurements ($a_x$, $a_y$ and $\Omega_z$), it is possible to isolate each of these inertial measurements by using the linear combinations of the phases obtained for each interferometer of inverted areas. The relations are demonstrated in the following table.

| $\Delta\Phi_{x,y}$ | $\Delta\Phi_{x,-y}$ | $\Delta\Phi_{-x,y}$ | $\Delta\Phi_{-x,-y}$ | Sum |
|---|---|---|---|---|
| + | − | − | + | $4K_x a_x^{tot} T^2$ |
| − | − | + | + | $4K_y a_y^{tot} T^2$ |
| + | − | + | − | $8 (\hbar/m) K_x K_y \Omega_z T^2$ |

The linear combinations of the different 2D interferometric phases hence provide access to the three inertial components $a_x^{tot}$, $a_y^{tot}$ and $\Omega_z$ with a scale factor increased by a factor four. In other words, the sensitivity to the inertial effects of this configuration is increased by a factor four with respect to a single two-dimensional interferometer.

These phase-shifts can be obtained thanks to sequential measurements using interferometers of inverted areas, or within a single measurement cycle using the double-diffraction effect as discussed hereinabove. This latter configuration is ideal for the inertial navigation applications, where rapid rotation and acceleration variations are possible.

To sum-up, FIG. 7 shows a scheme in which four interferometers of inverted relative areas are generated from a single atomic source, allowing the simultaneous measurement of three inertial components $a_x^{tot}$, $a_y^{tot}$ and $\Omega_z$. Moreover, the half of each arm of the interferometer is shared between two neighbour interferometers, which allows rejecting systematic errors as, for example, the one-photon offset.

Different embodiments of 2D MZ atom interferometer have been disclosed hereinabove.

Figure 8:
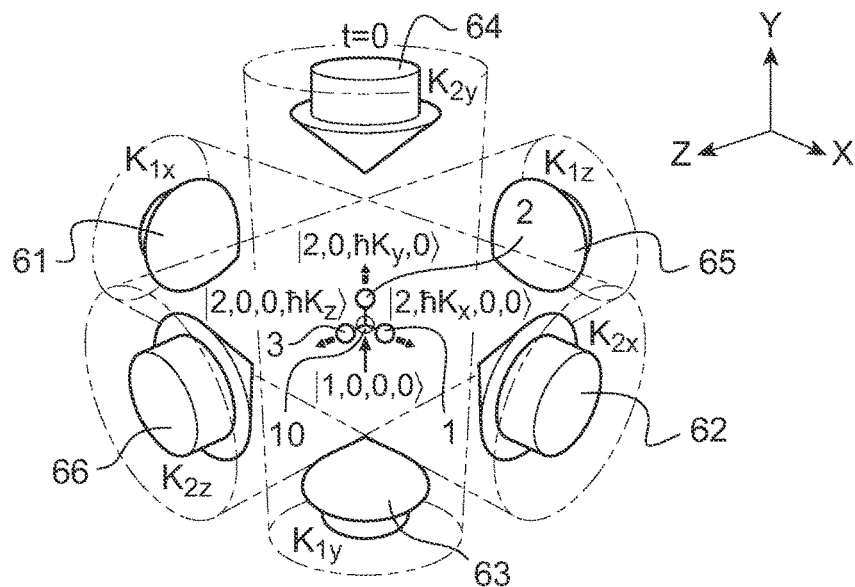
Figure 9:
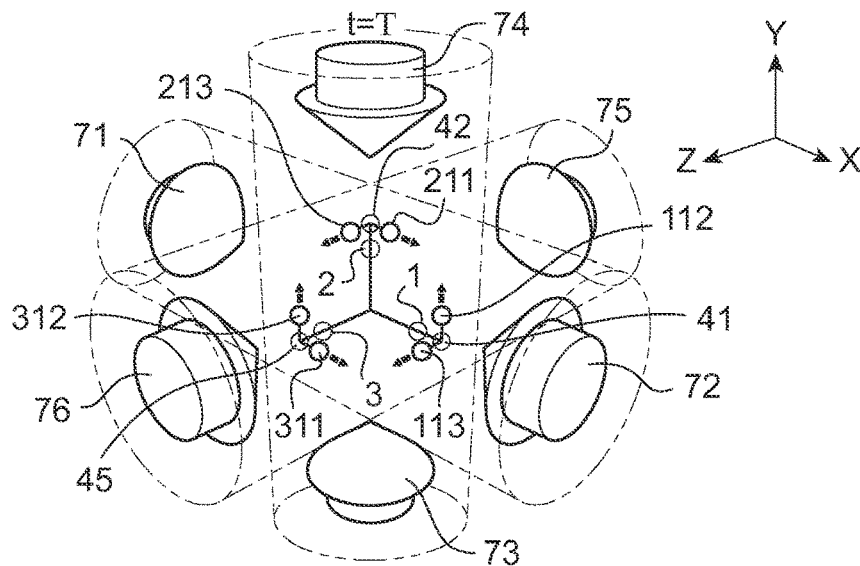
Figure 10:
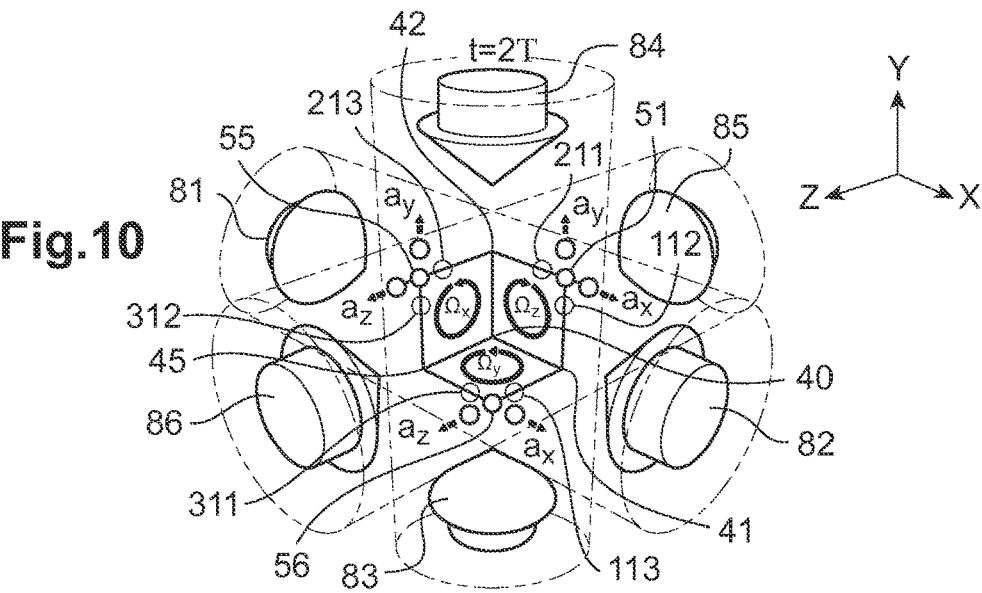

The present disclosure proposes to extend the above-described method to a 3D geometry by applying simultaneous laser beams along 3 orthogonal axes to generate three 2D interferometers in orthogonal planes, as shown in FIGS. 8 to 10. Here again, a single source 10 of cold atoms is used.

More precisely, in FIG. 8, at an initial time t=0, a source 10 of cold atoms is at a point 40 in space in an orthonormal XYZ-coordinate system. In FIG. 8, at time t=0, a first light pulse is split into three pairs of orthogonal light beams (61, 62) along the X-axis, (63, 64) along the Y-axis and (65, 66) along the Z-axis, these three pairs of light beams being adapted to form a 3D splitter. The area of this first light pulse is equal to $\pi/2$. This first light pulse splits, by 3D single-diffraction, the atoms 10 initially in the stationary state $|1,0,0,0\rangle$ into three equal parts forming three clouds of atoms: a first cloud of atoms 1 propagating along the X-axis in a state $|2, \hbar K_x, 0, 0\rangle$, a second cloud of atoms 2 propagating along the Y-axis in state $|2, 0, \hbar K_y, 0\rangle$ and a third cloud of atoms 3 propagating along the Z-axis in a state $|2, 0, 0, \hbar K_z\rangle$ up to the time t=T. During this process, a momentum $\hbar K_x$, non-zero, is transferred to the first cloud of atoms 1 diffracted in the X-direction, a momentum $\hbar K_y$, non-zero, is transferred to the second cloud of atoms 2 diffracted in the Y-direction and a momentum $\hbar K_z$, non-zero, is transferred to the third cloud of atoms 3 diffracted in the Z-direction. As in the 2D-embodiments, after the first pulse, there is no population of atoms left in the initial or fundamental state. In FIG. 9, at time t=T, a second light pulse is also split into three pairs of orthogonal light beams (71, 72) along the X-axis, (73, 74) along the Y-axis and (75, 76) along the Z-axis, these three pairs of light beams being adapted to form a 3D-mirror. The area of this second light pulse is equal to n. This second light pulse reflects, by 3D single-diffraction, each state along the two orthogonal directions at the incident speed. At point 41, the second light pulse splits the first cloud of atoms 1 in state $|2,\hbar K_x,0,0\rangle$ into a packet of atoms 112 propagating along the Y-axis and another packet of atoms 113 propagating along the Z-axis. At point 42, the second light pulse splits the second cloud of atoms 2 in state $|2,0,\hbar K_y,0\rangle$ into a packet of atoms 211 propagating along the X-axis and another packet of atoms 213 propagating along the Z-axis. At point 45, the second light pulse splits the third cloud of atoms 3 in state $|2,0,0,\hbar K_z\rangle$ into a packet of atoms 311 propagating along the X-axis and another packet of atoms 312 propagating along the Y-axis. During this process, a momentum $\hbar K_y$, non-zero, is transferred to the packet of atoms 112 diffracted in the Y-direction and a momentum $\hbar K_z$, non-zero, is transferred to the other packet of atoms 113 diffracted in the Z-direction. Simultaneously, a momentum $\hbar K_x$, non-zero, is transferred to the packet of atoms 211 diffracted in the X-direction and a momentum $\hbar K_z$, non-zero, is transferred to the other packet of atoms 213 diffracted in the Z-direction. Still simultaneously, a momentum $\hbar K_x$, non-zero, is transferred to the packet of atoms 311 diffracted in the X-direction and a momentum $\hbar K_y$, non-zero, is transferred to the other packet of atoms 312 diffracted in the Y-direction.

In FIG. 10, at time t=2T, a third light pulse is also split into three pairs of orthogonal light beams (81, 82) along the X-axis, (83, 84) along the Y-axis and (85, 86) along the Z-axis, these three pairs of light beams being adapted to form a 3D recombination device. The area of this third light pulse is equal to $\pi/2$. At point 51, the third light pulse recombines, by 3D single-diffraction, the packet of atoms 211 propagating along the X-axis and the packet of atoms 112 propagating along the Y-axis, to form a first 2D MZ interferometer in the XY-plane, sensitive to three inertial measurements ($a_x$, $a_y$ and $\Omega_z$). At point 56, the third light pulse recombines the packet of atoms 311 propagating along the X-axis and the packet of atoms 113 propagating along the Z-axis to form a second 2D MZ interferometer in the XZ-plane, sensitive to three inertial measurements ($a_x$, $a_z$ and $\Omega_y$). At point 55, the third light pulse recombines the packet of atoms 312 propagating along the Y-axis and the packet of atoms 213 propagating along the Z-axis to form a third 2D MZ interferometer in the XZ-plane, sensitive to three inertial measurements ($a_y$, $a_z$ and $\Omega_x$). An embodiment consists in detecting three spatially solved signals at the three corners of the cube 51, 55, 56. During this process, a momentum $-\hbar K_y$, non-zero, is transferred to the packet of atoms 112 and a momentum $-\hbar K_z$, non-zero, is transferred to the other packet of atoms 113. Simultaneously, a momentum $-\hbar K_x$, non-zero, is transferred to the packet of atoms 211 and a momentum $-\hbar K_z$, non-zero, is transferred to the other packet of atoms 213. Still simultaneously, a momentum $-\hbar K_x$, non-zero, is transferred to the packet of atoms 311 and a momentum $-\hbar K_y$, non-zero, is transferred to the other packet of atoms 312.

In the embodiment illustrated in FIG. 8 to 10, the light beams cover all the atoms.

Figure 11:
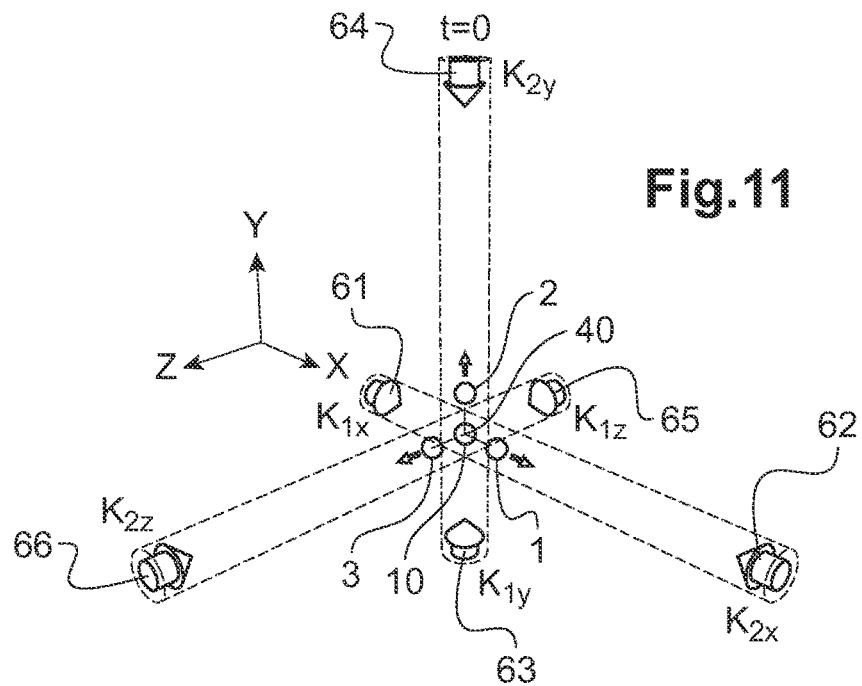
Figure 12:
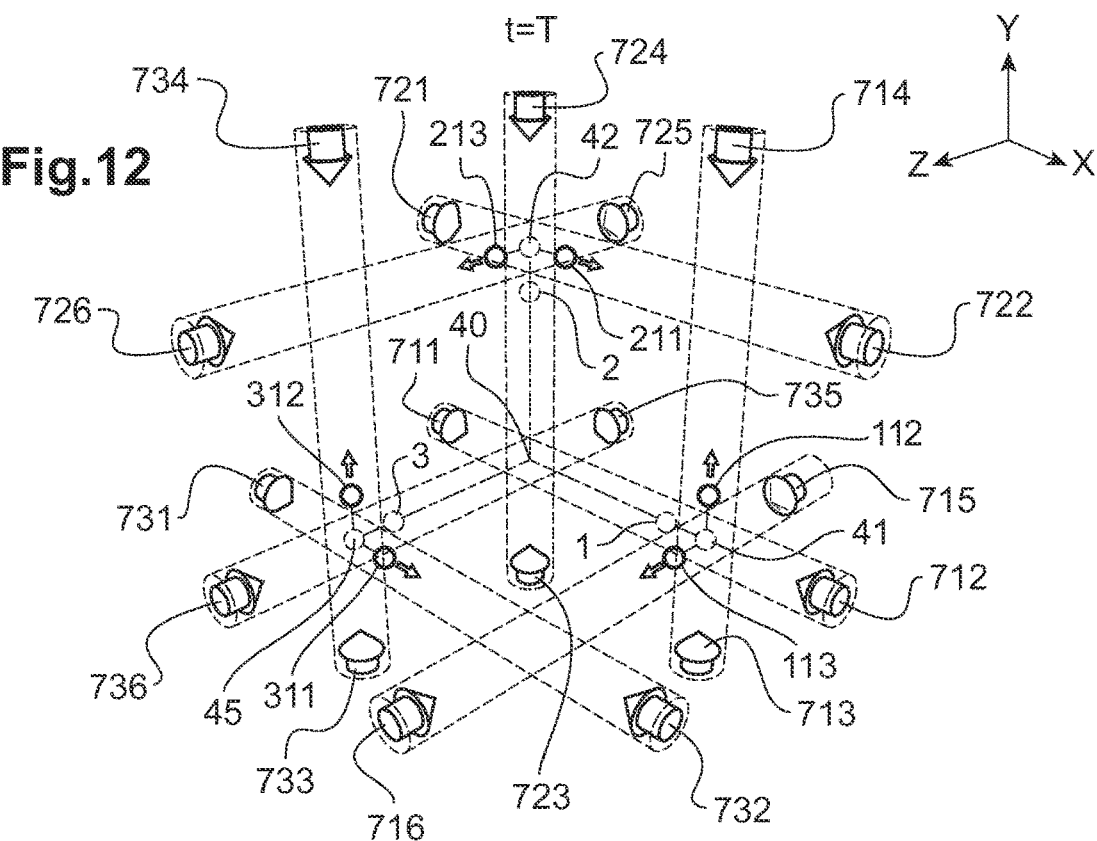
Figure 13:
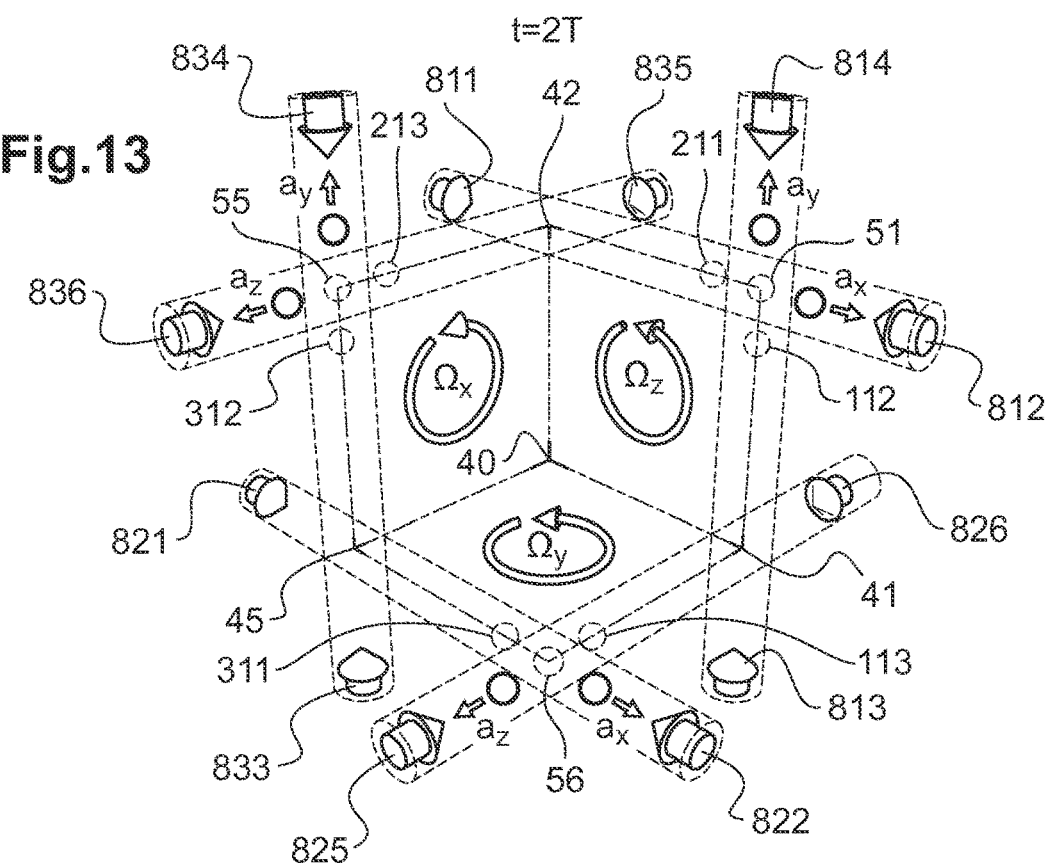

FIGS. 11 to 13 illustrate another embodiment of 3D MZ atom interferometer in which the light beams are selectively applied to each cloud or packet of atoms.

FIG. 11 is similar to FIG. 8.

In FIG. 12, at time t=T, a second light pulse is split into three times three pairs of orthogonal light beams along the X-axis, along the Y-axis and along the Z-axis, each of these three pairs of light beams being adapted to form a spatially resolved 3D mirror at point 41 for the first cloud of atoms 1. The area of each pair of light beams is here equal to n. More precisely, at point 41, the second light beam includes three pairs of orthogonal light beams: a pair of light beams (711,712) along the X-axis, another pair of light beams (713, 714) along the Y-axis and still another pair of light beams (715, 716) along the Z-axis, respectively. These three pairs of orthogonal light beams (711, 712), (713, 714) and (715, 716) split and reflect the first cloud of atoms 1 in state $|2,\hbar K_x,0,0\rangle$ into a packet of atoms 112 propagating along the Y-axis and another packet of atoms 113 propagating along the Z-axis at the incident speed. The second light pulse further includes three other pairs of orthogonal light beams: (721,722) along the X-axis, (723, 724) along the Y-axis and (725, 726) along the Z-axis, respectively, these three other pairs of light beams being adapted to form a spatially resolved 3D mirror at point 42 for the second cloud of atoms 2. At point 42, the second light pulse splits and reflects the second cloud of atoms 2 in state $|2,0,\hbar K_y,0\rangle$ into a packet of atoms 211 propagating along the X-axis and another packet of atoms 213 propagating along the Z-axis at the incident speed. Finally, the second light pulse also includes three other pairs of orthogonal light beams: (731,732) along the X-axis, (733, 734) along the Y-axis and (735, 736) along the Z-axis, respectively, these three other pairs of light beams being adapted to form a spatially resolved 3D mirror at point 43 for the third cloud of atoms 3. At point 45, the second light pulse (731, 732), (733, 734) and (735, 736) splits and reflects the third cloud of atoms 3 in state $|2,0,0,\hbar K_z\rangle$ into a packet of atoms 311 propagating along the X-axis and another packet of atoms 312 propagating along the Y-axis at the incident speed.

In FIG. 13, at time t=2T, a third light pulse includes three times two pairs of orthogonal light beams, each of these two pairs of light beams being adapted to form a 2D recombination device.

The third light pulse includes two pairs of orthogonal light beams: (811, 812) along the X-axis and (813, 814) along the Y-axis, respectively, these two pairs of light beams being adapted to form a spatially resolved recombination device at point 51. At point 51, the third light pulse (811,812) and (813, 814) recombines the packet of atoms 112 propagating along the Y-axis with the packet of atoms 211 propagating along the X-axis to form a first 2D MZ interferometer in the XY-plane. The first interferometer measures a phase-shift $\Delta\Phi_{x,y}$ sensitive to three inertial measurements ($a_x$, $a_y$ and $\Omega_z$).

The third light pulse includes two other pairs of orthogonal light beams (821,822) along the X-axis and (825, 826) along the Y-axis, respectively, these two pairs of light beams being adapted to form a spatially resolved recombination device at point 56. At point 56, the third light pulse (821, 822) and (825, 826) recombines the packet of atoms 311 propagating along the X-axis and the packet of atoms 113 propagating along the Z-axis to form a second 2D MZ interferometer in the XZ-plane. The second interferometer measures a phase-shift $\Delta\Phi_{z,x}$ sensitive to three inertial measurements ($a_x$, $a_z$ and $\Omega_y$).

Finally, the third light pulse also includes two other pairs of orthogonal light beams: (833, 834) along the Y-axis and (835, 836) along the Z-axis, respectively, these two other pairs of light beams being adapted to form a spatially resolved recombination device at point 55. At point 55, the third light pulse (833, 834) and (835, 836) recombines the packet of atoms 312 propagating along the Y-axis and the packet of atoms 213 propagating along the Z-axis to form a third 2D MZ interferometer in the XZ-plane. The third interferometer measures a phase-shift $\Delta\Phi_{y,x}$ sensitive to three inertial measurements ($a_y$, $a_z$ and $\Omega_x$).

To avoid transferring the atoms to spurious states of motion, this process requires separated pairs of beams aligned along the edges of a cube, as illustrated in FIGS. 11,12 and 13.

Finally, at time t=2T, the packets of atoms overlap each other at three opposite corners 51, 55 and 56 of the cube, where six pairs of beams (811, 812), (813, 814), (821,822), (825, 826), (833, 834), (835, 836) make a third recombination pulse that transfers a part of the population of each state of motion in each plane towards a stationary state. The spatially resolved detection of these nine clouds makes it possible to obtain a sensitivity to the acceleration and rotation vectors. More precisely, there are 6 packets in motion that have for momentum either $\hbar \cdot k_x$, or $\hbar \cdot k_y$, or $\hbar \cdot k_z$, and there are also 3 motionless packets at the three corners 51,55, 56 of the cube. In each MZ interferometer, there are two ports: one port for the motionless cloud and another port for the clouds in motion in two possible directions. Each inertial measurement component can then be isolated as described hereinabove in the 2D case in relation with FIG. 7.

The sum of the phases $\Delta\Phi_{x,y}$, $\Delta\Phi_{y,z}$ and $\Delta\Phi_{z,x}$ obtained by the interferences at the corners 51, 55, 56 of the cube is particularly interesting. In the case where the effective wavevectors have the same norm ($K_x=K_y=K_z=K$), this sum is:

$$\Delta\Phi_{x,y} + \Delta\Phi_{y,z} + \Delta\Phi_{z,x} = 2\frac{\hbar}{m}K^2(\Omega_x + \Omega_y + \Omega_z)T^2 \quad (9)$$

It is observed that this sum contains all the components of the rotation vector $\Omega_x$, $\Omega_y$ and $\Omega_z$ and is insensitive to the accelerations, including the Coriolis acceleration due to the initial atomic speed. The elimination of this speed-dependence is an advantage for an atomic gyroscope that can hence benefit from the same absolute accuracy as an atomic gravimeter because all the quantities that appear in the scale factor are accurately known.

A multi-axis atom interferometer according to the present disclosure finds applications in inertial navigation, geology, gradiometry, geodesy or seismology.

The invention claimed is:

1. A multi-axis atom interferometer system, comprising:
a source of cold atoms;
a temporally modulated laser source to generate a sequence of light pulses comprising at least one first light pulse incident on the source of cold atoms at an initial time t, a second light pulse at a time equal to t+T, and a last light pulse at a time equal to t+2T;
the at least one first light pulse being configured in such a way as to spatially split the source of cold atoms into at least a first cloud of atoms propagating along a first trajectory along a first axis and a second cloud of atoms propagating along a second trajectory along a second axis, the second axis being inclined with respect to the first axis;
the second light pulse being configured to spatially deflect the first trajectory of the first cloud of atoms for at least one part of the first cloud of atoms along the second axis of the second cloud of atoms towards a first point and simultaneously deflect the second trajectory of the second cloud of atoms for of at least one part of the second cloud of atoms along the first axis towards the first point;
the last light pulse being configured to recombine said at least one part of the first cloud of atoms and said at least one part of the second cloud of atoms at the first point and to form an at least two-dimensional Mach-Zehnder atom interferometer;
a detection system configured to measure a first interferometric phase-shift between said at least one part of the first cloud of atoms and said at least one part of the second cloud of atoms, the first interferometric phase-shift being accumulated on said first and second trajectories between the at least one first light pulse and the last light pulse,
wherein
the at least one first light pulse is configured to one or more of
(i) spatially split the source of cold atoms by double diffraction into a first packet of atoms and a second packet of atoms propagating in mutually opposed directions along the first axis, and
(ii) spatially split the source of cold atoms by double diffraction into a third packet of atoms and a fourth packet of atoms propagating in mutually opposed directions along the second axis,
the second light pulse is configured to one or more of
(i) simultaneously deflect a part of the first packet of atoms along the second axis and a part of the third packet of atoms along the first axis towards the first point,
(ii) simultaneously deflect another part of the first packet of atoms along the second axis and a part of the fourth packet of atoms along the first axis towards a second point,
(iii) simultaneously deflect a part of the second packet of atoms along the second axis and another part of the third packet of atoms along the first axis towards the third point, and
(iv) simultaneously deflect another part of the second packet of atoms along the second axis and another part of the fourth packet of atoms along the first axis towards a fourth point, and
the last light pulse is configured to one or more of:
(i) recombine, at the first point, the part of the first packet of atoms and the part of the third packet of atoms forming a first two-dimensional Mach-Zehnder atom interferometer in a first plane,
(ii) recombine, at the second point, the other part of the first packet of atoms and the part of the fourth packet of atoms forming a second two-dimensional Mach-Zehnder atom interferometer in the first plane,
(iii) recombine, at the third point, the part of the second packet of atoms and the other part of the third packet of atoms forming a third two-dimensional Mach-Zehnder atom interferometer in the first plane, and
(iv) recombine, at the fourth point, the other part of the second packet of atoms along the second axis and the other part of the fourth packet of atoms forming a fourth two-dimensional Mach-Zehnder atom interferometer in the first plane, and the detection system is configured to measure at at least three points among the first point, second point, third point, and fourth point, respectively, one or more of
(i) the first interferometric phase-shift of the first atom interferometer,
(ii) a second interferometric phase-shift of the second atom interferometer,
(iii) a third interferometric phase-shift of the third atom interferometer, and
(iv) a fourth interferometric phase-shift of the fourth atom interferometer.

2. The multi-axis atom interferometer system according to claim 1, wherein the at least one first light pulse is split into a first pair of light beams counter-propagating along the first axis towards the source of cold atoms and another first pair of light beams counter-propagating along the second axis towards the source of cold atoms, said first pairs of light beams being simultaneously incident on the source of cold atoms at the initial time t.

3. The multi-axis atom interferometer system according to claim 2, wherein the at least one first light pulse is further split into an other first pair of light beams counter-propagating along the third axis towards the source of cold atoms, all three pairs of light beams being simultaneously incident on the source of cold atoms at the initial time t, in such a way as to spatially split the source of cold atoms into the first cloud of atoms propagating along the first axis, the second cloud of atoms propagating along the second axis and a third cloud of atoms propagating along the third axis;
the second light pulse being configured to spatially split and deflect the first cloud of atoms into a first packet of atoms propagating along the second axis towards a first point and a second packet of atoms propagating along the third axis towards a second point; and to spatially spit and deflect the second cloud of atoms into a third packet of atoms propagating along the first axis towards the first point and a fourth packet of atoms propagating along the third axis towards a third point, and to spatially split and deflect the third cloud of atoms into a fifth packet of atoms propagating along the first axis towards the second point and a sixth packet of atoms propagating along the second axis towards the third point;
the last light pulse being configured to recombine at the first point the first packet of atoms and the third packet of atoms forming a first two-dimensional Mach-Zehnder atom interferometer in a first plane, and to recombine at the second point the second packet of atoms and the fifth packet of atoms forming a second two-dimensional Mach-Zehnder atom interferometer in a second plane and to recombine at the third point the fourth packet of atoms and the sixth packet of atoms forming a third two-dimensional Mach-Zehnder atom interferometer in a third plane, and
the detection system being configured to simultaneously measure the first interferometric phase-shift of the first Mach-Zehnder atom interferometer, a second interferometric phase-shift of the second Mach-Zehnder atom interferometer and a third interferometric phase-shift of the third Mach-Zehnder atom interferometer.

4. The multi-axis atom interferometer system according to claim 3, wherein the detection system includes a spatially resolved image sensor configured to simultaneously detect the first interferometric phase-shift at the first point, the second interferometric phase-shift at the second point and the third interferometric phase-shift at the third point.

5. The multi-axis atom interferometer system according to claim 3, wherein the detection system includes a first detector configured to detect the first interferometric phase-shift at the first point, a second detector configured to detect the second interferometric phase-shift at the second point and a third detector configured to detect the third interferometric phase-shift at the third point.

6. The multi-axis atom interferometer system according to claim 3, wherein the second light pulse is split into three pairs of light beams configured to spatially split and deflect the first cloud of atoms into a first packet of atoms propagating along the second axis towards a first point and a second packet of atoms propagating along the third axis towards a second point; the second light pulse comprising three other pairs of light beams configured to spatially split and deflect the second cloud of atoms into a third packet of atoms propagating along the first axis towards the first pointer and a fourth packet of atoms propagating along the third axis towards a third point, and the second light pulse being also split into three other pairs of light beams configured to spatially split and deflect the third cloud of atoms into a fifth packet of atoms propagating along the first axis towards the second point and a sixth packet of atoms propagating along the second axis towards the third point and
wherein the last light pulse is split into two pairs of light beams configured to recombine at the first point the first packet of atoms and the third packet of atoms forming the first two-dimensional Mach-Zehnder atom interferometer in the first plane, the last light pulse being split into two other pairs of light beams configured to recombine at the second point the second packet of atoms and the fifth packet of atoms forming a second two-dimensional Mach-Zehnder atom interferometer in the second plane and the last light pulse being further split into two other pairs of light beams configured to recombine at the third point the fourth packet of atoms and the sixth packet of atoms forming the third two-dimensional Mach-Zehnder atom interferometer in the third plane.

7. The multi-axis atom interferometer system according to claim 6, wherein the detection system includes a spatially resolved image sensor configured to simultaneously detect the first interferometric phase-shift at the first point, the second interferometric phase-shift at the second point and the third interferometric phase-shift at the third point.

8. The multi-axis atom interferometer system according to claim 6, wherein the detection system includes a first detector configured to detect the first interferometric phase-shift at the first point, a second detector configured to detect the second interferometric phase-shift at the second point and a third detector configured to detect the third interferometric phase-shift at the third point.

9. The multi-axis atom interferometer system according to claim 1, wherein the second light pulse is split into pair of light beams counter-propagating along the first axis and another pair of light beams counter-propagating along the second axis, said pairs of light beams being simultaneously incident on said at least one part of the first cloud of atoms and said at least one part of the second cloud of atoms.

10. The multi-axis atom interferometer system according to claim 1, wherein the last light pulse is split into a pair of light beams counter-propagating along the first axis and another pair of light beams counter-propagating along the second axis towards the first point, said pairs of light beams being simultaneously incident on said at least one part of the first cloud of atoms and said at least one part of the second cloud of atoms, at the first point.

11. The multi-axis atom interferometer system according to claim 1, further comprising a signal processing system configured to extract from the first interferometric phase-shift a first signal function of a first acceleration of the source of cold atoms along the first axis, a second acceleration along the second axis and a rotation about a third axis inclined with respect to the first axis and to the second axis.

12. The multi-axis atom interferometer system according to claim 11,
wherein the signal processing system is configured to extract the first acceleration along the first axis, the second acceleration along the second axis and the rotation about the third axis by linear combination of at least three among the first interferometric phase-shift, the second interferometric phase-shift, the third interferometric phase-shift and the fourth interferometric phase-shift.

13. The multi-axis atom interferometer system according to claim 12, wherein the detection system includes a first detector configured to detect the first interferometric phase-shift about the first point, a second detector configured to detect the second interferometric phase-shift about the second point, a third detector configured to detect the third interferometric phase-shift about the third point and/or a fourth detector configured to detect the fourth interferometric phase-shift about the fourth point.

14. The multi-axis atom interferometer system according to claim 1, wherein the detection system includes a spatially resolved image sensor configured to simultaneously detect at least three among the first interferometric phase-shift, the second interferometric phase-shift, the third interferometric phase-shift and the fourth interferometric phase-shift.

15. The multi-axis atom interferometer system according to claim 1, wherein the detection system includes one or more of a first detector configured to detect the first interferometric phase-shift about the first point, a second detector configured to detect the second interferometric phase-shift about the second point, a third detector configured to detect the third interferometric phase-shift about the third point, and a fourth detector configured to detect the fourth interferometric phase-shift about the fourth point.

16. A multi-axis atom interferometry method comprising the following steps:
generating a source of cold atoms;
generating a sequence of light pulses comprising at least one first light pulse incident on the source of cold atoms at an initial time t, a second light pulse at a time equal to t+T and a last light pulse at a time equal to t+2T;
the at least one first light pulse being configured in such a way as to spatially split the source of cold atoms into at least one first cloud of atoms propagating along a first trajectory along a first axis and one second cloud of atoms propagating along a second trajectory along a second axis, the second axis being inclined with respect to the first axis;
the second light pulse being configured to spatially deflect the first trajectory of at least one part of the first cloud of atoms along the second axis towards a first point and simultaneously the second trajectory of at least one part of the second cloud of atoms along the first axis towards the first point;
the last light pulse being configured to recombine said at least one part of the first cloud of atoms and said at least one part of the second cloud of atoms at the first point and to form an at least two-dimensional Mach-Zehnder atom interferometer;
detecting at least one first interferometric phase-shift between said at least one part of the first cloud of atoms and said at least one part of the second cloud of atoms, the first interferometric phase-shift being accumulated on said first and second trajectories between the initial time t and the time t+2T,
wherein
the at least one first light pulse is configured to one or more of
(i) spatially split the source of cold atoms by double diffraction into a first packet of atoms and a second packet of atoms propagating in mutually opposed directions along the first axis, and
(ii) spatially split the source of cold atoms by double diffraction into a third packet of atoms and a fourth packet of atoms propagating in mutually opposed directions along the second axis,
the second light pulse is configured to one or more of:
(i) simultaneously deflect a part of the first packet of atoms along the second axis and a part of the third packet of atoms along the first axis towards the first point,
(ii) simultaneously deflect another part of the first packet of atoms along the second axis and a part of the fourth packet of atoms along the first axis towards a second point,
(iii) simultaneously deflect a part of the second packet of atoms along the second axis and another part of the third packet of atoms along the first axis towards the third point, and
(iv) simultaneously deflect another part of the second packet of atoms along the second axis and another part of the fourth packet of atoms along the first axis towards a fourth point, and
the last light pulse is configured to one or more of:
(i) recombine, at the first point, the part of the first packet of atoms and the part of the third packet of atoms forming a first two-dimensional Mach-Zehnder atom interferometer in a first plane,
(ii) recombine, at the second point, the other part of the first packet of atoms and the part of the fourth packet of atoms forming a second two-dimensional Mach-Zehnder atom interferometer in the first plane,
(iii) recombine, at the third point, the part of the second packet of atoms and the other part of the third packet of atoms forming a third two-dimensional Mach-Zehnder atom interferometer in the first plane, and
(iv) recombine, at the fourth point, the other part of the second packet of atoms along the second axis and the other part of the fourth packet of atoms forming a fourth two-dimensional Mach-Zehnder atom interferometer in the first plane, and
the detection system is configured to measure at at least three points among the first point, second point, third point, and fourth point, respectively, one or more of:
(i) the first interferometric phase-shift of the first atom interferometer,
(ii) a second interferometric phase-shift of the second atom interferometer,
(iii) a third interferometric phase-shift of the third atom interferometer, and (iv) a fourth interferometric phase-shift of the fourth atom interferometer.

17. The multi-axis atom interferometer system comprising:
a source of cold atoms;
a temporally modulated laser source to generate a sequence of light pulses comprising at least one first light pulse incident on the source of cold atoms at an initial time t, a second light pulse at a time equal to t+T, and a last light pulse at a time equal to t+2T;
the at least one first light pulse being configured in such a way as to spatially split the source of cold atoms into at least a first cloud of atoms propagating along a first trajectory along a first axis and a second cloud of atoms propagating along a second trajectory along a second axis, the second axis being inclined with respect to the first axis;
the second light pulse being configured to spatially deflect the first trajectory of the first cloud of atoms for at least one part of the first cloud of atoms along the second axis of the second cloud of atoms towards a first point and simultaneously deflect the second trajectory of the second cloud of atoms for of at least one part of the second cloud of atoms along the first axis towards the first point;
the last light pulse being configured to recombine said at least one part of the first cloud of atoms and said at least one part of the second cloud of atoms at the first point and to form an at least two-dimensional Mach-Zehnder atom interferometer;
a detection system configured to measure a first interferometric phase-shift between said at least one part of the first cloud of atoms and said at least one part of the second cloud of atoms, the first interferometric phase-shift being accumulated on said first and second trajectories between the at least one first light pulse and the last light pulse,
wherein the at least one first light pulse is split into a first pair of light beams counter-propagating along the first axis towards the source of cold atoms and another first pair of light beams counter-propagating along the second axis towards the source of cold atoms, said first pairs of light beams being simultaneously incident on the source of cold atoms at the initial time t, and
wherein the second light pulse is split into a second pair of light beams counter-propagating along the first axis and another second pair of light beams counter-propagating along the second axis, said second pairs of light beams being simultaneously incident on said at least one part of the first cloud of atoms said at least one part of the second cloud of atoms.

18. A multi-axis atom interferometer system comprising:
a source of cold atoms;
a temporally modulated laser source to generate a sequence of light pulses comprising at least one first light pulse incident on the source of cold atoms at an initial time t, a second light pulse at a time equal to t+T, and a last light pulse at a time equal to t+2T;
the at least one first light pulse being configured in such a way as to spatially split the source of cold atoms into at least a first cloud of atoms propagating along a first trajectory along a first axis and a second cloud of atoms propagating along a second trajectory along a second axis, the second axis being inclined with respect to the first axis;
the second light pulse being configured to spatially deflect the first trajectory of the first cloud of atoms for at least one part of the first cloud of atoms along the second axis of the second cloud of atoms towards a first point and simultaneously deflect the second trajectory of the second cloud of atoms for of at least one part of the second cloud of atoms along the first axis towards the first point;
the last light pulse being configured to recombine said at least one part of the first cloud of atoms and said at least one part of the second cloud of atoms at the first point and to form an at least two-dimensional Mach-Zehnder atom interferometer;
a detection system configured to measure a first interferometric phase-shift between said at least one part of the first cloud of atoms and said at least one part of the second cloud of atoms, the first interferometric phase-shift being accumulated on said first and second trajectories between the at least one first light pulse and the last light pulse,
wherein the at least one first light pulse is split into a first pair of light beams counter-propagating along the first axis towards the source of cold atoms and another first pair of light beams counter-propagating along the second axis towards the source of cold atoms, said first pairs of light beams being simultaneously incident on the source of cold atoms at the initial time t, and
wherein the last light pulse is split into a last pair of light beams counter-propagating along the first axis and another last pair of light beams counter-propagating along the second axis towards the first point, said last pairs of light beams being simultaneously incident on said at least one part of the first cloud of atoms and said at least one part of the second cloud of atoms, at the first point.

19. The multi-axis atom interferometer system comprising:
a source of cold atoms;
a temporally modulated laser source to generate a sequence of light pulses comprising at least one first light pulse incident on the source of cold atoms at an initial time t, a second light pulse at a time equal to t+T, and a last light pulse at a time equal to t+2T;
the at least one first light pulse being configured in such a way as to spatially split the source of cold atoms into at least a first cloud of atoms propagating along a first trajectory along a first axis and a second cloud of atoms propagating along a second trajectory along a second axis, the second axis being inclined with respect to the first axis;
the second light pulse being configured to spatially deflect the first trajectory of the first cloud of atoms for at least one part of the first cloud of atoms along the second axis of the second cloud of atoms towards a first point and simultaneously deflect the second trajectory of the second cloud of atoms for of at least one part of the second cloud of atoms along the first axis towards the first point;
the last light pulse being configured to recombine said at least one part of the first cloud of atoms and said at least one part of the second cloud of atoms at the first point and to form an at least two-dimensional Mach-Zehnder atom interferometer;
a detection system configured to measure a first interferometric phase-shift between said at least one part of the first cloud of atoms and said at least one part of the second cloud of atoms, the first interferometric phase-shift being accumulated on said first and second trajectories between the at least one first light pulse and the last light pulse, wherein the second light pulse is split into a pair of light beams counter-propagating along the first axis and another pair of light beams counter-propagating along the second axis, said pairs of light beams being simultaneously incident on said at least one part of the first cloud of atoms and said at least one part of the second cloud of atoms, and wherein the last light pulse is split into a last pair of light beams counter-propagating along the first axis and another last pair of light beams counter-propagating along the second axis towards the first point, said last pairs of light beams being simultaneously incident on said at least one part of the first cloud of atoms and said at least one part of the second cloud of atoms, at the first point.

* * * * *